(12) United States Patent
Shigehiro

(10) Patent No.: US 10,203,800 B2
(45) Date of Patent: Feb. 12, 2019

(54) DISPLAY DEVICE WITH TOUCH DETECTION FUNCTION

(71) Applicant: Japan Display Inc., Tokyo (JP)

(72) Inventor: Koji Shigehiro, Tokyo (JP)

(73) Assignee: Japan Display Inc., Tokyo (JP)

( * ) Notice: Subject to any disclaimer, the term of this patent is extended or adjusted under 35 U.S.C. 154(b) by 38 days.

(21) Appl. No.: 15/290,922

(22) Filed: Oct. 11, 2016

(65) Prior Publication Data

US 2017/0108982 A1    Apr. 20, 2017

(30) Foreign Application Priority Data

Oct. 13, 2015 (JP) .................................. 2015-202287

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0418* (2013.01); *G06F 2203/04108* (2013.01)

(58) Field of Classification Search
CPC ......... G06F 2203/04108; G06F 3/0412; G06F 3/0416; G06F 3/0418; G06F 3/044
See application file for complete search history.

(56) References Cited

U.S. PATENT DOCUMENTS 9,588,631 B2 *  3/2017  Noguchi ............... G06F 3/0412
9,606,655 B2 *  3/2017  Choo .................... G06F 3/0412
2003/0016508 A1 *  1/2003  Kurumisawa ....... G02F 1/13454
                                                          361/749
2012/0056835 A1 *  3/2012  Choo ..................... G06F 3/0412
                                                          345/173
2013/0082954 A1 *  4/2013  Azumi .................... G06F 3/041
                                                          345/173

(Continued)

FOREIGN PATENT DOCUMENTS

JP    2001-272954 A    10/2001
JP    2010-187221 A    8/2010
JP    2014-146093 A    8/2014

OTHER PUBLICATIONS

Japan Office Action dated Dec. 10, 2018, corresponding to Japanese Patent Application No. 2015-202287.

*Primary Examiner* — Afroza Chowdhury
(74) *Attorney, Agent, or Firm* — Michael Best & Friedrich LLP

(57) ABSTRACT

According to an aspect, a display device with a touch detection function includes: a display unit; a detecting unit; and a control unit that controls an operation timing of the display unit and the detecting unit. The control unit performs display processing and touch detection processing alternately a plurality of times in a display period of an image of one frame, the display processing being processing of performing control on the electric charge, the touch detection processing being processing of performing the touch detection. The control unit varies a length of a first period, a length of a second period, or both in display periods of images of two frames that are displayed consecutively, the first period being a period in which the display processing is performed once, the second period being a period in which the touch detection processing is performed once.

18 Claims, 18 Drawing Sheets

(56) References Cited

U.S. PATENT DOCUMENTS

2013/0314360 A1* 11/2013 Saitoh .................. G06F 3/0412
　　　　　　　　　　　　　　　　　　　　　　345/173
2014/0160086 A1* 6/2014 Lee ..................... G06F 3/0418
　　　　　　　　　　　　　　　　　　　　　　345/178
2014/0210775 A1 7/2014 Ota et al.

* cited by examiner

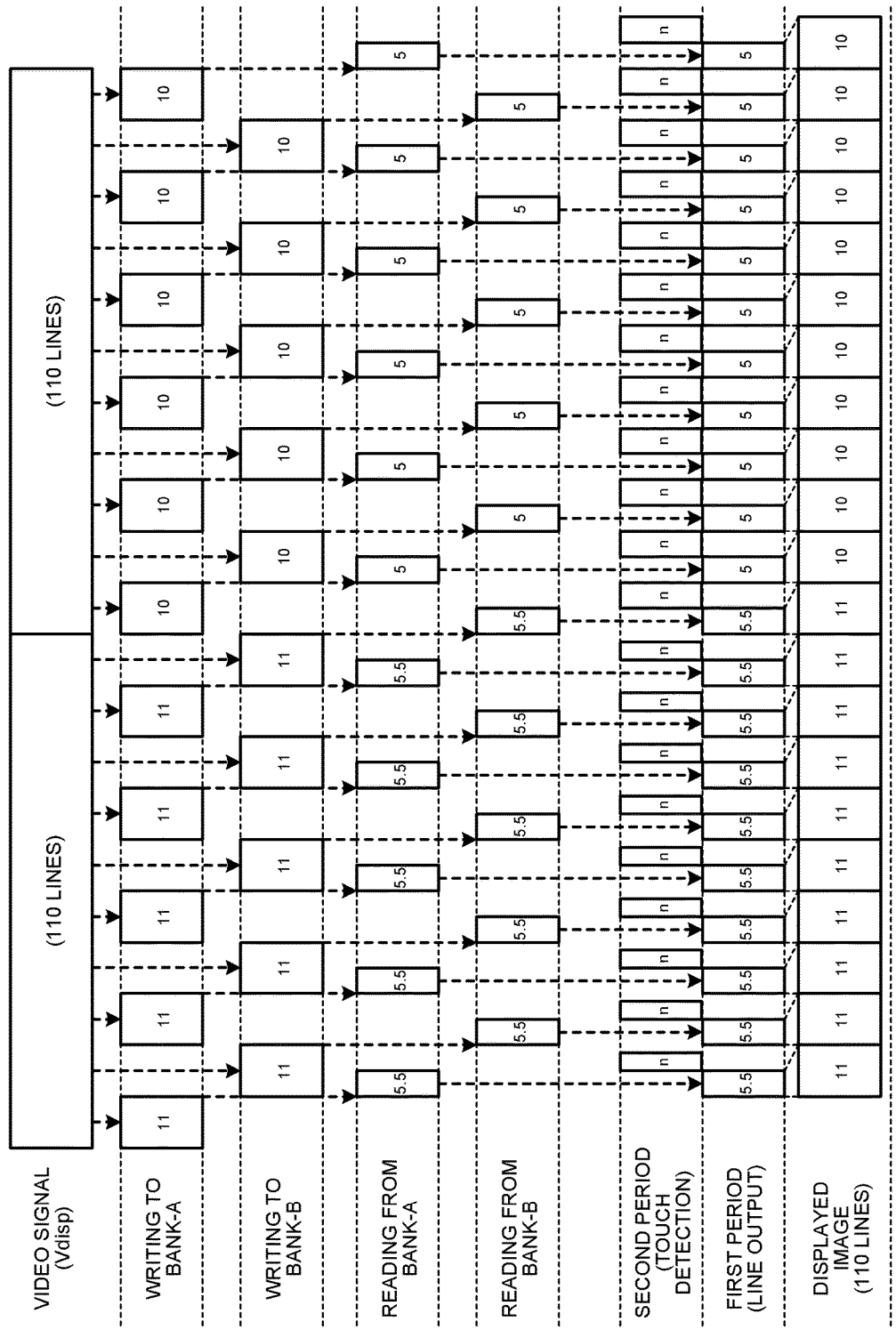

DISPLAY DEVICE WITH TOUCH DETECTION FUNCTION

CROSS-REFERENCE TO RELATED APPLICATIONS

This application claims priority from Japanese Application No. 2015-202287, filed on Oct. 13, 2015, the contents of which are incorporated by reference herein in its entirety.

BACKGROUND

1. Technical Field

The present disclosure relates to a display device with a touch detection function.

2. Description of the Related Art

In these years widely known are display devices that can be used for inputting information via a touch panel (hereinafter, referred to as display devices with a touch detection function). Such display devices with a touch detection function are provided by: placing a device that detects proximity or contact, what is called a touch panel, on top of a display device, such as a liquid-crystal display device; or integrating the touch panel with the display device. To reduce effect on touch detection caused by noise generated due to the configuration of the display device, some display devices with a touch detection function divides an image of one frame into multiple parts to display the parts independently and perform touch detection on a touch panel during display intervals (refer to Japanese Patent Application Laid-open Publication No. 2012-48295 (JP-A-2012-48295) corresponding to Japanese Patent Application No. 2010-187221, for example).

In the display device with a touch detection function disclosed in JP-A-2012-48295, a period of display scanning for display output and a period of touch detection processing performed during intervals of display scanning are periodic. Such periodic display scanning and periodic touch detection processing may possibly periodically generate noise that affects display and touch detection. The noise may possibly manifest itself as a display stripe at each divided display area (divided block) for periodic divided display output, effect on a touch detection result caused by radiant noise at a divided block period, etc.

For the foregoing reasons, there is a need for a display device with a touch detection function that can reduce periodic generation of noise.

SUMMARY

According to an aspect, a display device with a touch detection function includes: a display unit that changes a display output content depending on an electric charge supplied to a first electrode and a second electrode; a detecting unit that includes a touch detection electrode to generate capacitance with one of the first electrode and the second electrode and performs touch detection based on a change in the capacitance; and a control unit that controls an operation timing of the display unit and the detecting unit. The control unit performs display processing and touch detection processing alternately a plurality of times in a display period of an image of one frame, the display processing being processing of performing control on the electric charge, the touch detection processing being processing of performing the touch detection. The control unit varies a length of a first period, a length of a second period, or both in display periods of images of two frames that are displayed consecutively, the first period being a period in which the display processing is performed once, the second period being a period in which the touch detection processing is performed once.

BRIEF DESCRIPTION OF THE DRAWINGS

FIG. 22 is a timing chart of an example of a relation between the first period and the second period according to a second modification.

DETAILED DESCRIPTION

Figure 1:
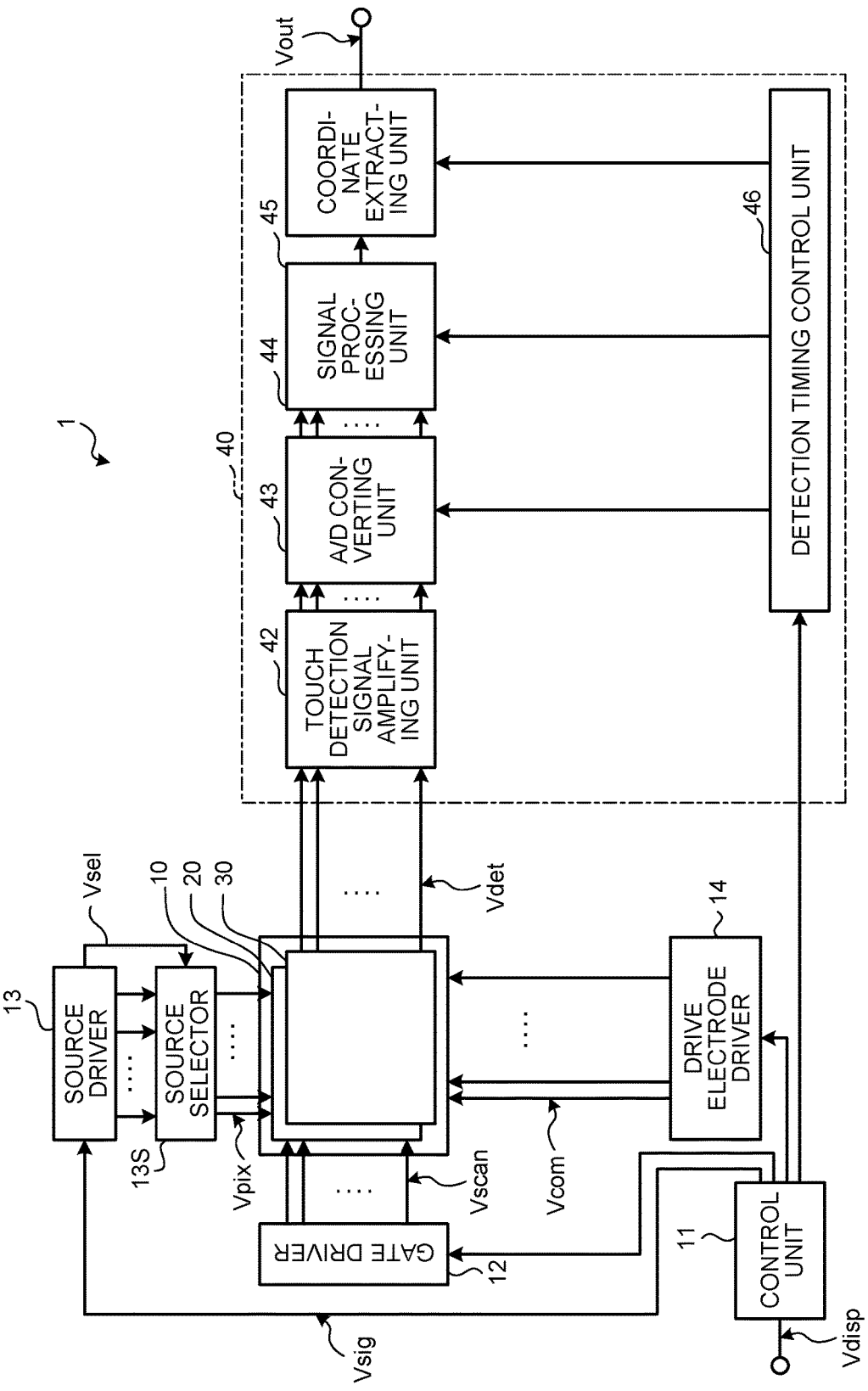
FIG. 1 is a block diagram of an exemplary configuration of a display device with a touch detection function.

An exemplary embodiment according to the present invention is described below with reference to the accompanying drawings. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by the same reference numerals, and overlapping explanation thereof will be appropriately omitted.

In this disclosure, when an element is described as being "on" another element, the element can be directly on the other element, or there can be one or more elements between the element and the other element.

Embodiment

FIG. 1 is a block diagram of an exemplary configuration of a display device with a touch detection function. A display device 1 with a touch detection function includes a display unit 10 with a touch detection function, a control unit 11, a gate driver 12, a source driver 13, a source selector 13S, a drive electrode driver 14, and a touch detecting unit 40. The display device 1 with a touch detection function is a display device including the display unit 10 with a touch detection function. The display unit 10 with a touch detection function is what is called an in-cell device in which a capacitive touch detecting device 30 is integrated with a liquid-crystal display device 20 including liquid-crystal display elements serving as display elements. Alternatively, the display unit 10 with a touch detection function may be what is called an on-cell device in which the capacitive touch detecting device 30 is provided on the liquid-crystal display device 20 including liquid-crystal display elements serving as display elements. In the case of an on-cell device, the touch detecting device 30 may be provided directly on the liquid-crystal display device 20 or above the liquid-crystal display device 20 with another layer interposed therebetween. While the liquid-crystal display device 20 serves as a display unit according to the present embodiment, the display unit may be a device including organic light-emitting diodes (OLEDs). In this case, one of anodes and cathodes constituting the OLEDs may be used as drive electrodes COML relating to touch detection, which will be described later.

The liquid-crystal display device 20 sequentially scans each of horizontal lines based on a scanning signal Vscan supplied from the gate driver 12, thereby performing display, which will be described later. The control unit 11 is a circuit that supplies control signals to the gate driver 12, the source driver 13, the drive electrode driver 14, and the touch detecting unit 40, respectively, based on video signals Vdisp supplied from a host, which will be described later, and thus performs control such that these components operate in synchronization with one another. A control device according to the present disclosure includes the control unit 11, the gate driver 12, the source driver 13, and the drive electrode driver 14.

The gate driver 12 has a function to select sequentially one horizontal line to be a target of display drive performed by the display unit 10 with a touch detection function based on the control signal supplied from the control unit 11.

The source driver 13 is a circuit that supplies pixel signals Vpix to corresponding pixels Pix (sub-pixels SPix) of the display unit 10 with a touch detection function based on the control signal supplied from the control unit 11. The source driver 13 is supplied with G-bit digital image signals Vsig of red (R), green (G), and blue (B), for example. The source driver 13 generates pixel signals from the video signal Vdisp of one horizontal line by time-division multiplexing the pixel signals Vpix for the sub-pixels SPix in the liquid-crystal display device 20 and supplies them to the source selector 13S. The source driver 13 also generates a switch control signal Vsel required to separate the pixel signals Vpix multiplexed with the image signals Vsig and supplies the generated switch control signal Vsel to the source selector 13S together with the pixel signals Vpix. The source selector 13S can reduce the number of wiring between the source driver 13 and the control unit 11. The source selector 13S is not necessarily provided.

The drive electrode driver 14 is a circuit that supplies a drive signal for touch detection (a touch drive signal, which is hereinafter referred to as a drive signal) VcomAC and a display drive voltage VcomDC serving as a voltage for display to the drive electrodes COML, which will be described later, of the display unit 10 with a touch detection function based on the control signal supplied from the control unit 11.

The touch detecting unit 40 is a circuit that detects whether a touch (contact state) is made on the touch detecting device 30 based on the control signal supplied from the control unit 11 and based on a touch detection signal Vdet supplied from the touch detecting device 30 of the display unit 10 with a touch detection function. If a touch is made, the touch detecting unit 40 derives the coordinates and the like in a touch detection area. The touch detecting unit 40 includes a touch detection signal amplifying unit 42, an analog/digital (A/D) converting unit 43, a signal processing unit 44, a coordinate extracting unit 45, and a detection timing control unit 46.

The touch detection signal amplifying unit 42 amplifies the touch detection signal Vdet supplied from the touch detecting device 30. The touch detection signal amplifying unit 42 may include an analog low-pass filter that removes high-frequency components (noise components) included in the touch detection signal Vdet to extract a touch component and outputs the extracted component.

In the following description, components used exclusively for display out of the components of the display device 1 with a touch detection function illustrated in FIG. 1 may be collectively referred to as a "display unit". The "display unit" includes the liquid-crystal display device 20, the gate driver 12, the source driver 13, and the drive electrode driver 14, for example.

Figure 2:
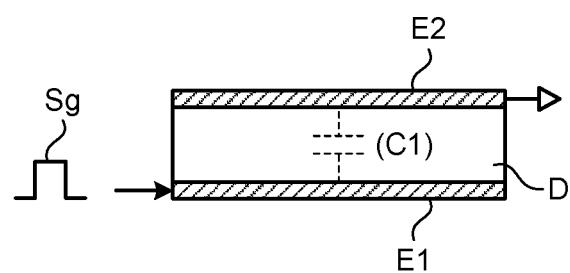
FIG. 2 is a diagram for explaining the basic principle of capacitive touch detection and illustrates a state where no finger is in contact with or in proximity to a touch detection electrode.
Figure 3:
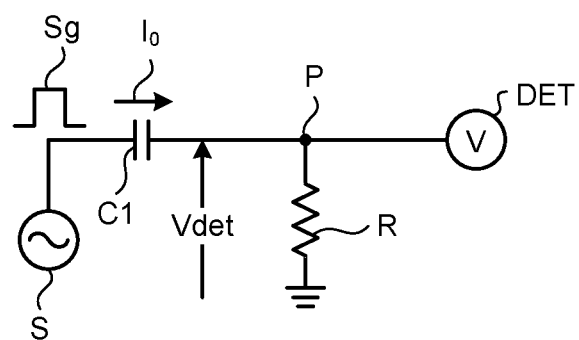
FIG. 3 is a diagram for explaining an example of an equivalent circuit in the state where no finger is in contact with or in proximity to the touch detection electrode as illustrated in FIG. 2.
Figure 4:
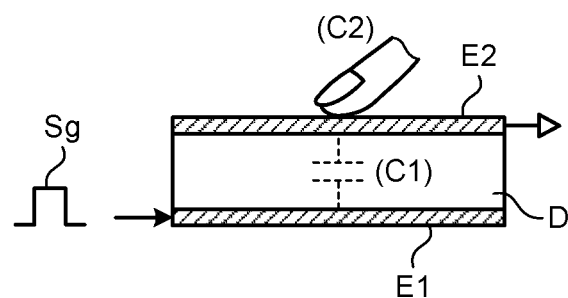
FIG. 4 is a diagram for explaining the basic principle of capacitive touch detection and illustrates a state where a finger is in contact with or in proximity to the touch detection electrode.
Figure 5:
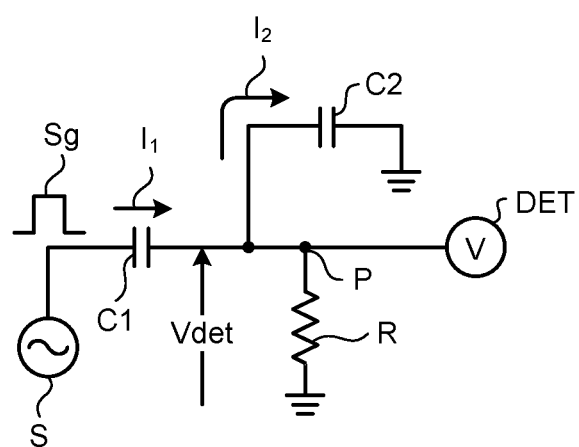
FIG. 5 is a diagram for explaining an example of the equivalent circuit in the state where a finger is in contact with or in proximity to the touch detection electrode as illustrated in FIG. 4.
Figure 6:
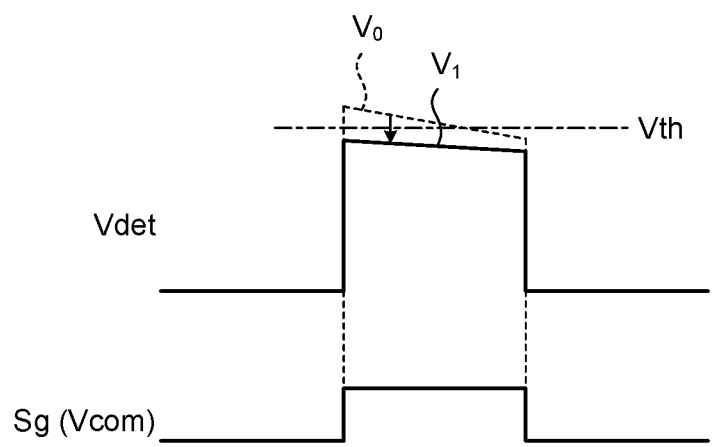
FIG. 6 is a diagram of an example of waveforms of a drive signal and a touch detection signal.

The touch detecting device 30 operates based on the basic principle of capacitive touch detection to output the touch detection signal Vdet. The following describes the basic principle of touch detection performed by the display device 1 with a touch detection function according to the present embodiment with reference to FIGS. 2 to 6. FIG. 2 is a diagram for explaining the basic principle of capacitive touch detection and illustrates a state where no finger is in contact with or in proximity to a touch detection electrode. FIG. 3 is a diagram for explaining an example of an equivalent circuit in the state where no finger is in contact with or in proximity to the touch detection electrode as illustrated in FIG. 2. FIG. 4 is a diagram for explaining the basic principle of capacitive touch detection and illustrates a state where a finger is in contact with or in proximity to the touch detection electrode. FIG. 5 is a diagram for explaining an example of the equivalent circuit in the state where a finger is in contact with or in proximity to the touch detection electrode as illustrated in FIG. 4. FIG. 6 is a diagram of an example of waveforms of a drive signal and a touch detection signal.

As illustrated in FIG. 2, for example, a capacitive element C1 includes a pair of electrodes of a drive electrode E1 and a touch detection electrode E2 facing each other with a dielectric D interposed therebetween. As illustrated in FIG. 3, a first end of the capacitive element C1 is coupled to an alternating-current (AC) signal source (drive signal source) S, whereas a second end P thereof is grounded via a resistor R and coupled to a voltage detector (touch detecting unit) DET. The voltage detector DET is an integration circuit included in the touch detection signal amplifying unit 42 illustrated in FIG. 1, for example.

When the AC signal source S applies an AC rectangular wave Sg having a predetermined frequency (e.g., approximately several kilohertz to several hundred kilohertz) to the drive electrode E1 (first end of the capacitive element C1), an output waveform (touch detection signal Vdet) is generated via the voltage detector DET coupled to the touch detection electrode E2 (second end of the capacitive element C1). The AC rectangular wave Sg corresponds to the drive signal VcomAC, which will be described later.

In a state where no finger is in contact with (or in proximity to) the touch detection electrode (non-contact state), an electric current $I_0$ depending on the capacitance value of the capacitive element C1 flows with charge and discharge of the capacitive element C1 as illustrated in FIGS. 2 and 3. The potential waveform at the second end P of the capacitive element C1 is represented by a waveform $V_0$ in FIG. 6, for example, and is detected by the voltage detector DET illustrated in FIG. 3.

In a state where a finger is in contact with (or in proximity to) the touch detection electrode (contact state), capacitance generated by the finger acts as if it serves as a capacitive element C2 added to the capacitive element C1 as illustrated in FIG. 4. As illustrated in the equivalent circuit in FIG. 5, the capacitive element C2 is added in series to the capacitive element C1. In this state, electric currents $I_1$ and $I_2$ flow with charge and discharge of the capacitive elements C1 and C2, respectively. The potential waveform at the second end P of the capacitive element C1 is represented by a waveform $V_1$ in FIG. 6, for example, and is detected by the voltage detector DET. The electric potential at the second end P is a voltage-divided potential determined based on the values of the electric currents $I_1$ and $I_2$ flowing through the capacitive elements C1 and C2, respectively. As a result, the waveform $V_1$ has a value smaller than that of the waveform $V_0$ in the non-contact state. The voltage detector DET compares the detected voltage with a predetermined threshold voltage Vth. If the detected voltage is equal to or higher than the threshold voltage Vth, the voltage detector DET determines that the finger is in the non-contact state. By contrast, if the detected voltage is lower than the threshold voltage Vth, the voltage detector DET determines that the finger is in the contact state. As described above, the display device 1 with a touch detection function can perform touch detection.

The touch detecting device 30 illustrated in FIG. 1 sequentially scans each detection block based on the drive signal Vcom (drive signal VcomAC, which will be described later) supplied from the drive electrode driver 14, thereby performing touch detection.

The touch detecting device 30 outputs the touch detection signals Vdet of respective detection blocks from a plurality of touch detection electrodes TDL, which will be described later, via the voltage detector DET illustrated in FIG. 3 or 5 to supply the touch detection signals Vdet to the A/D converting unit 43 of the touch detecting unit 40.

The A/D converting unit 43 is a circuit that samples an analog signal output from the touch detection signal amplifying unit 42, thereby converting the analog signal into digital signal at a timing synchronized with the drive signal VcomAC.

The signal processing unit 44 includes a digital filter that reduces frequency components (noise components) other than the frequency at which the drive signal VcomAC is sampled in the output signal from the A/D converting unit 43. The signal processing unit 44 is a logic circuit that detects whether a touch is made on the touch detecting device 30 based on the output signal from the A/D converting unit 43. The signal processing unit 44 performs processing of extracting only a signal of difference caused by the finger. The signal of difference caused by the finger corresponds to an absolute value |ΔV| of the difference between the waveform $V_0$ and the waveform $V_1$. The signal processing unit 44 may perform an arithmetic operation for averaging the absolute value |ΔV| per detection block, thereby calculating the average of the absolute value |ΔV|. With this operation, the signal processing unit 44 can reduce effect of noise. The signal processing unit 44 compares the detected signal of difference caused by the finger with the predetermined threshold voltage Vth. If the voltage of the detected signal is equal to or higher than the threshold voltage Vth, the signal processing unit 44 determines that an external proximity object is in the non-contact state. By contrast, if the detected digital voltage is lower than the threshold voltage Vth, the signal processing unit 44 determines that an external proximity object is in the contact state. As described above, the touch detecting unit 40 can perform touch detection.

The coordinate extracting unit 45 is a logic circuit that derives, when a touch is detected by the signal processing unit 44, the touch panel coordinates of the touch. The detection timing control unit 46 performs control such that the A/D converting unit 43, the signal processing unit 44, and the coordinate extracting unit 45 operate in synchronization with one another. The coordinate extracting unit 45 outputs the touch panel coordinates as signal output Vout.

Figure 7:
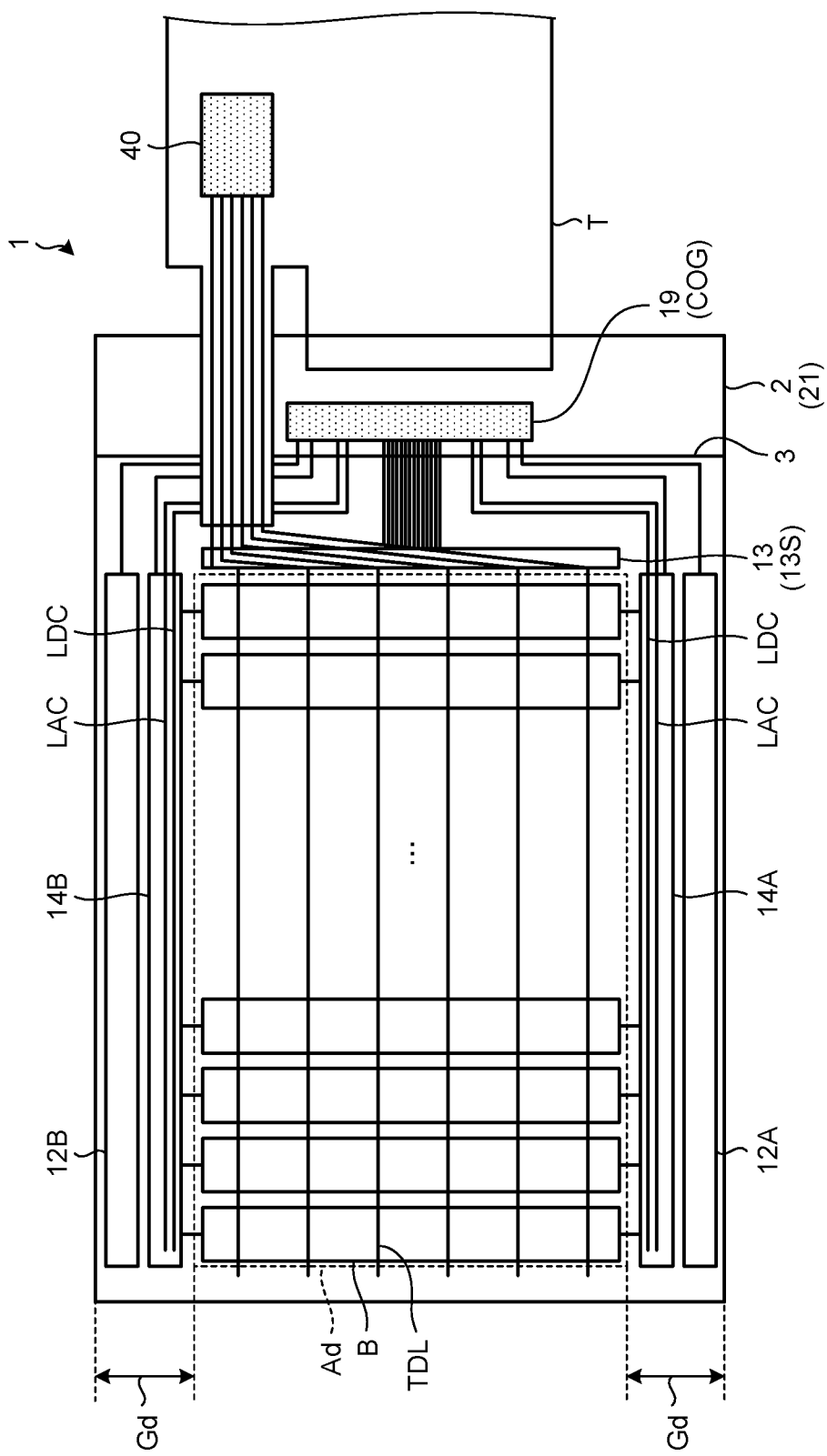
FIG. 7 is a diagram of an example of a module in which the display device with a touch detection function is installed.

FIG. 7 is a diagram of an example of a module in which the display device with a touch detection function is installed. As illustrated in FIG. 7, the display device 1 with a touch detection function includes a pixel substrate 2 (TFT substrate 21) and a flexible printed circuit board T, which will be described later. The pixel substrate 2 (TFT substrate 21) is provided with a chip on glass (COG) 19 and has a display area Ad of the liquid-crystal display device 20 and a frame Gd. The COG 19 is a chip of an integrated circuit (IC) driver mounted on the TFT substrate 21 and is a control device including circuits required for a display operation, such as an operation control circuit 80 serving as the control unit 11 illustrated in FIG. 1. The source driver 13 and the source selector 13S according to the present embodiment are provided on the TFT substrate 21. Alternatively, the source driver 13 and the source selector 13S may be included in the COG 19. Drive electrode scanning units 14A and 14B serving as part of the drive electrode driver 14 are provided to the TFT substrate 21. The gate driver 12 is also provided to the TFT substrate 21 and includes gate drivers 12A and 12B. The display device 1 with a touch detection function may include circuits, such as the drive electrode scanning units 14A and 14B and the gate driver 12, in the COG 19. The COG 19 is given by way of example of an aspect of implementation, and the embodiment is not limited thereto. A component having the same functions as those of the COG 19 may be provided to a chip on film or a chip on flexible (COF), for example.

As illustrated in FIG. 7, drive electrode blocks B of the drive electrodes COML intersect with the touch detection electrodes TDL in a grade separated manner in a direction perpendicular to the surface of the TFT substrate 21.

The drive electrodes COML are a plurality of stripe electrode patterns extending in one direction. To perform a touch detection operation, the drive electrode driver 14 sequentially supplies the drive signal VcomAC to the electrode patterns. Each drive electrode block B illustrated in FIG. 7 corresponds to a striped electrode pattern of a plurality of drive electrodes COML simultaneously supplied with the drive signal VcomAC. The drive electrode blocks B (drive electrodes COML) are provided side by side in the long-side direction of the display unit 10 with a touch detection function. The touch detection electrodes TDL, which will be described later, extend in a direction intersecting with the extending direction of the drive electrode blocks B. The touch detection electrodes TDL are provided side by side in the short-side direction of the display unit 10 with a touch detection function, for example. The output ends of the touch detection electrodes TDL are provided on the short side of the display unit 10 with a touch detection function. The output ends are coupled to the touch detecting unit 40 mounted on the flexible printed circuit board T via the flexible printed circuit board T. As described above, the touch detecting unit 40 is mounted on the flexible printed circuit board T and is coupled to the touch detection electrodes TDL arranged side by side. The flexible printed circuit board T simply needs to be a terminal and is not limited to a flexible printed circuit board. In a case where the flexible printed circuit board T is a terminal, the touch detecting unit 40 is provided to the outside of the module. While the touch detecting unit 40 according to the present embodiment is a touch driver IC mounted on the flexible printed circuit board T, part of the functions of the touch detecting unit 40 may be provided as functions of another circuit such as a micro-processing unit (MPU). Specifically, the touch driver IC may have various functions, such as A/D conversion and removal of noise, and a part of the functions, such as removal of noise, may be performed by a circuit, such as an MPU, provided separately from the touch driver IC. In a case where a single driver IC is provided (one-chip configuration), detection signals may be transmitted to the touch driver IC on an array substrate via wiring of the flexible printed circuit board T, for example.

The source selector 13S includes TFT elements and is provided near the display area Ad on the TFT substrate 21. The display area Ad includes a plurality of pixels Pix, which will be described later, arranged in a matrix (in rows and columns). The frame Gd is an area including no pixel Pix viewed in the direction perpendicular to the surface of the TFT substrate 21. The gate driver 12 and the drive electrode scanning units 14A and 14B of the drive electrode driver 14 are located in the frame Gd.

The gate driver 12 includes a first gate driver 12A and a second gate driver 12B, for example. The gate driver 12 includes TFT elements and is provided on the TFT substrate 21. The first gate driver 12A and the second gate driver 12B sandwich the display area Ad including the sub-pixels SPix (pixels), which will be described later, arranged in a matrix and can drive it from both sides. Scanning lines are arranged between the first gate driver 12A and the second gate driver 12B. In other words, the scanning lines extend along a direction parallel to the extending direction of the drive electrodes COML viewed in the direction perpendicular to the surface of the TFT substrate 21. While the gate driver 12 of the present embodiment includes two circuits of the first gate driver 12A and the second gate driver 12B, this is given by way of example of a specific configuration of the gate driver 12, and the gate driver 12 of the embodiment is not limited thereto. The gate driver 12 may be one circuit provided to one end of the scanning lines.

The drive electrode scanning units 14A and 14B each include TFT elements and are provided on the TFT substrate 21. The drive electrode scanning units 14A and 14B are supplied with the display drive voltage VcomDC via display wiring LDC and with the drive signal VcomAC via touch wiring LAC from a drive signal generating unit. The drive electrode scanning units 14A and 14B can drive, from both sides, the drive electrode blocks B arranged side by side. The display wiring LDC that supplies the display drive voltage VcomDC and the touch wiring LAC that supplies the touch drive signal VcomAC are arranged in parallel in the frames Gd. The display wiring LDC is arranged closer to the display area Ad than the touch wiring LAC. With this configuration, the display drive voltage VcomDC supplied by the display wiring LDC stabilizes the potential state at the ends of the display area Ad, thereby stabilizing display especially in a liquid-crystal display device including lateral electric-field mode liquid crystals. While the drive electrode driver 14 of the present embodiment includes two circuits of the drive electrode scanning units 14A and 14B, the drive electrode driver 14 may include either one of them.

The display device 1 with a touch detection function illustrated in FIG. 7 outputs the touch detection signals Vdet from the short side of the display unit 10 with a touch detection function. This configuration facilitates routing of the wiring to couple the display device 1 with a touch detection function to the touch detecting unit 40 via the flexible printed circuit board T serving as a terminal.

Figure 8:
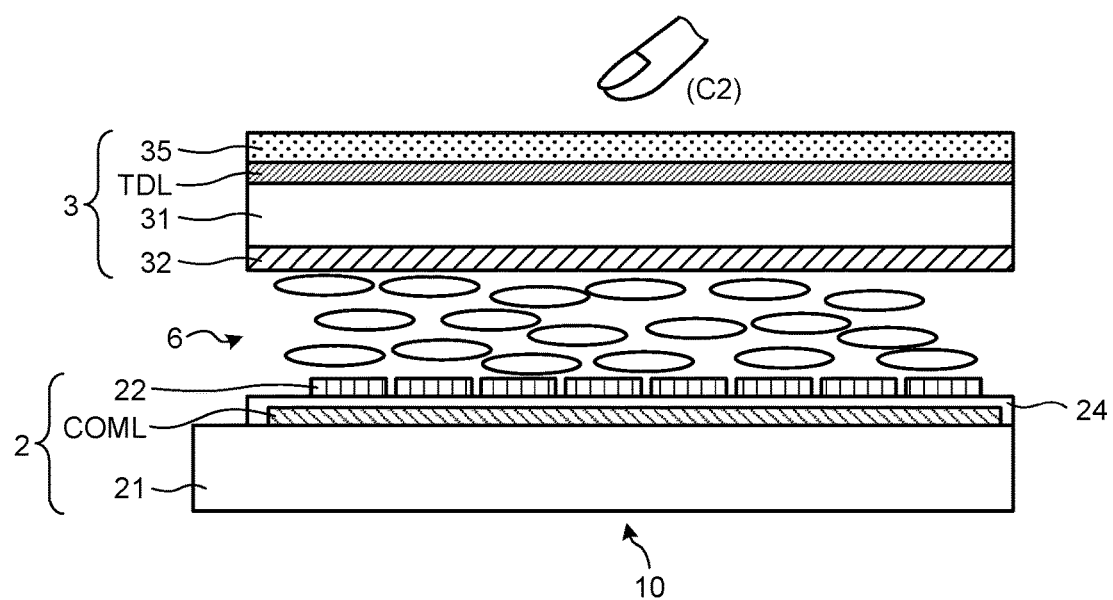
FIG. 8 is a schematic sectional view of a display unit with a touch detection function.
Figure 9:
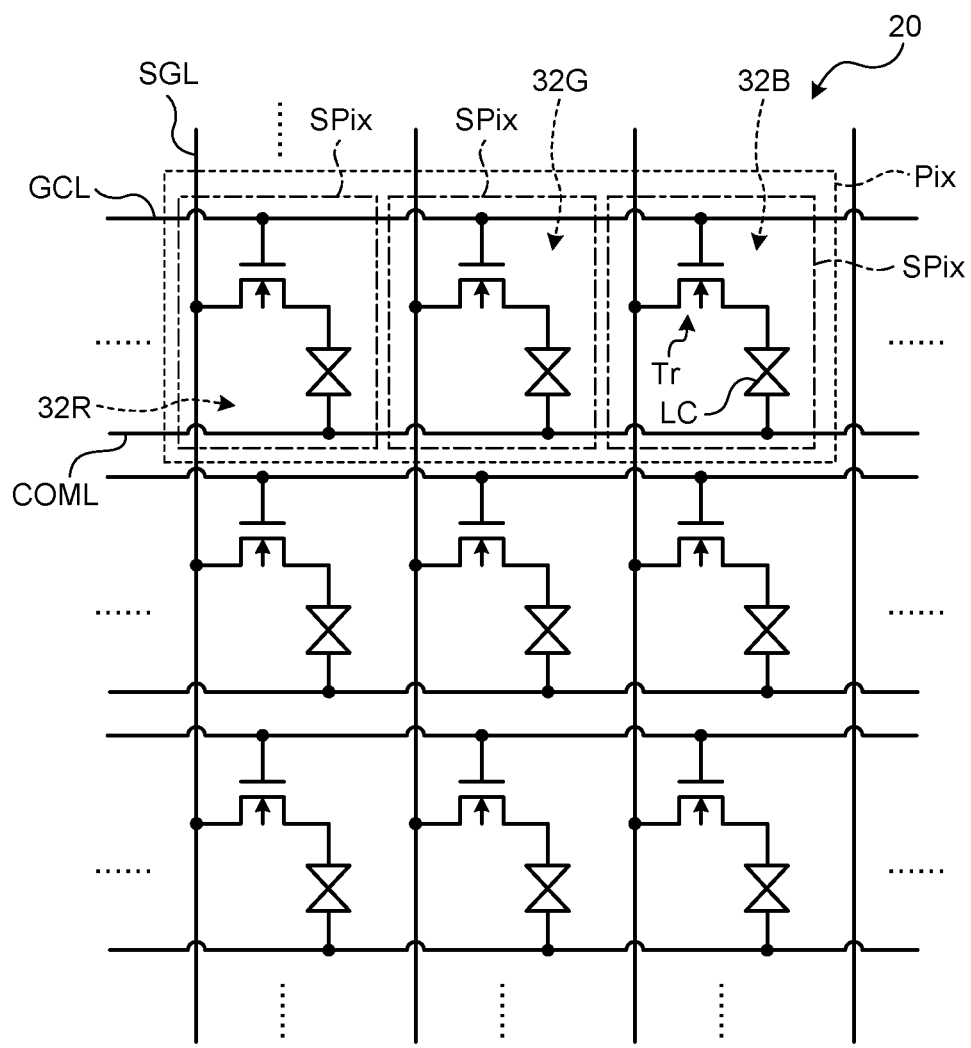
FIG. 9 is a circuit diagram of a pattern of pixels in the display unit with a touch detection function.

FIG. 8 is a schematic sectional view of the display unit with a touch detection function. FIG. 9 is a circuit diagram of a pattern of pixels in the display unit with a touch detection function. The display unit 10 with a touch detection function includes the pixel substrate 2, a counter substrate 3, and a liquid-crystal layer 6. The counter substrate 3 faces the pixel substrate 2 in the direction perpendicular to the surface of the pixel substrate 2. The liquid-crystal layer 6 is interposed between the pixel substrate 2 and the counter substrate 3.

The pixel substrate 2 includes the TFT substrate 21, a plurality of pixel electrodes 22, the drive electrodes COML, and an insulation layer 24. The TFT substrate 21 serves as a circuit board. The pixel electrodes 22 are arranged in a matrix on the TFT substrate 21. The drive electrodes COML are provided between the TFT substrate 21 and the pixel electrodes 22. The insulation layer 24 provides electrical insulation between the pixel electrodes 22 and the drive electrodes COML. The TFT substrate 21 is provided with thin-film transistor (TFT) elements Tr of respective sub-pixels SPix illustrated in FIG. 9 and wiring, such as signal lines SGL and scanning lines GCL. The signal lines SGL supply the pixel signals Vpix to the respective pixel electrodes 22 illustrated in FIG. 8, and the scanning lines GCL drive the TFT elements Tr. The signal lines SGL extend on a plane parallel to the surface of the TFT substrate 21 and supply the pixel signals Vpix for displaying an image on the pixels. The liquid-crystal display device 20 illustrated in FIG. 9 includes a plurality of sub-pixels SPix arranged in a matrix. The sub-pixels SPix each include the TFT element Tr and a liquid-crystal element LC. The TFT element Tr is a thin-film transistor and is an n-channel metal oxide semiconductor (MOS) TFT in this example. One of the source and the drain of the TFT element Tr is coupled to the signal line SGL, the gate thereof is coupled to the scanning line GCL, and the other of the source and the drain thereof is coupled to a first end of the liquid-crystal element LC. The first end of the liquid-crystal element LC is coupled to the drain of the TFT element Tr, and a second end thereof is coupled to the drive electrode COML, for example. The positions of the pixel electrodes 22 and the drive electrodes COML may be reversed.

The sub-pixel SPix illustrated in FIG. 9 is coupled to the other sub-pixels SPix belonging to the same row in the liquid-crystal display device 20 via the scanning line GCL. The scanning line GCL is coupled to the gate driver 12 and supplied with the scanning signal Vscan from the gate driver 12. The sub-pixel SPix is coupled to the other sub-pixels SPix belonging to the same column in the liquid-crystal display device 20 via the signal line SGL. The signal line SGL is coupled to the source driver 13 and supplied with the pixel signal Vpix from the source driver 13. The sub-pixel SPix is also coupled to the other sub-pixels SPix belonging to the same row in the liquid-crystal display device 20 via the drive electrode COML. The drive electrode COML is coupled to the drive electrode driver 14 and supplied with the drive signal Vcom from the drive electrode driver 14. In other words, one drive electrode COML is shared by a plurality of sub-pixels SPix belonging to the same row in this example. The direction in which the drive electrodes COML according to the present embodiment extend is parallel to the direction in which the scanning lines GCL extend. The direction in which the drive electrodes COML according to the present embodiment extend, however, is not limited thereto and may be parallel to the direction in which the signal lines SGL extend, for example.

The gate driver 12 illustrated in FIG. 1 applies the scanning signal Vscan to the gates of the TFT elements Tr of the pixels Pix via the scanning line GCL illustrated in FIG. 9. As a result, the gate driver 12 sequentially selects one row as a target of display drive (one horizontal line) out of the sub-pixels SPix arranged in a matrix in the liquid-crystal display device 20. The source driver 13 illustrated in FIG. 1 supplies the pixel signals Vpix to the sub-pixels SPix constituting one horizontal line sequentially selected by the gate driver 12 via the signal lines SGL illustrated in FIG. 9. These sub-pixels SPix perform display of one horizontal line based on the supplied pixel signals Vpix. The drive electrode driver 14 illustrated in FIG. 1 applies the drive signal Vcom, thereby driving the drive electrodes COML in each block including a predetermined number of drive electrodes COML.

As described above, the gate driver 12 drives to linearly sequentially scan the scanning lines GCL in the liquid-crystal display device 20 in a time-division manner, i.e. so as to scan, one after another, one scanning line GL at a time, thereby sequentially selecting one horizontal line. The source driver 13 supplies the pixel signals Vpix to the sub-pixels SPix belonging to the horizontal line in the liquid-crystal display device 20, thereby performing display of each horizontal line. To perform the display operation, the drive electrode driver 14 applies the drive signal Vcom to the block including the drive electrodes COML corresponding to the horizontal line.

The liquid-crystal layer 6 modulates light passing therethrough depending on the state of an electric field. When the drive electrode COML is driven, a voltage depending on the pixel signals Vpix supplied to the pixel electrodes 22 is applied, thereby generating an electric field. The liquid crystals constituting the liquid-crystal layer 6 are oriented depending on the electric field, thereby modulating the light passing through the liquid-crystal layer 6. As described above, the pixel electrodes 22 and the drive electrodes COML serve as first electrodes and second electrodes that generate an electric field in the liquid-crystal layer. In other words, the liquid-crystal display device 20 serves as a display unit that changes display output contents depending on an electric charge supplied to the first electrodes and the second electrodes. While the pixel electrodes 22 are the first electrodes and the drive electrodes COML are the second electrodes in the following description, the pixel electrodes 22 may be the second electrodes and the drive electrodes COML may be the first electrodes.

The present embodiment, for example, employs a liquid-crystal display device including lateral electric-field mode liquid crystals, such as fringe field switching (FFS) and in-plane switching (IPS). An orientation film may be provided between the liquid-crystal layer 6 and the pixel substrate 2 and between the liquid-crystal layer 6 and the counter substrate 3 illustrated in FIG. 8.

The counter substrate 3 includes a glass substrate 31 and a color filter 32 provided on one surface of the glass substrate 31. The touch detection electrodes TDL serving as the detection electrodes of the touch detecting device 30 are provided on the other surface of the glass substrate 31. A polarization plate 35 is provided on the touch detection electrodes TDL. The method for mounting the color filter 32 may be what is called a color-filter on array (COA) method of providing the color filter 32 on the pixel substrate 2 serving as an array substrate.

In the color filter 32 illustrated in FIG. 8, color areas colored with three colors of red (R), green (G), and blue (B), for example, are periodically arranged such that color areas 32R, 32G, and 32B colored with the three colors of R, G, and B, respectively, correspond to the respective sub-pixels SPix. In addition, a set of the color areas 32R, 32G, and 32B constitutes each pixel Pix. The pixels Pix are arranged in a matrix in the direction parallel to the scanning lines GCL and the direction parallel to the signal lines SGL, thereby constituting the display area Ad, which will be described later. The color filter 32 faces the liquid-crystal layer 6 in the direction perpendicular to the TFT substrate 21. As described above, each sub-pixel SPix can display a single color. The color filter 32 may have another combination of colors as long as they are different colors. The color filter 32 is not necessarily provided. Specifically, an area having no color filter 32, that is, an uncolored sub-pixel SPix may be present. The number of sub-pixels SPix included in the pixel Pix may be four or more.

Figure 10:
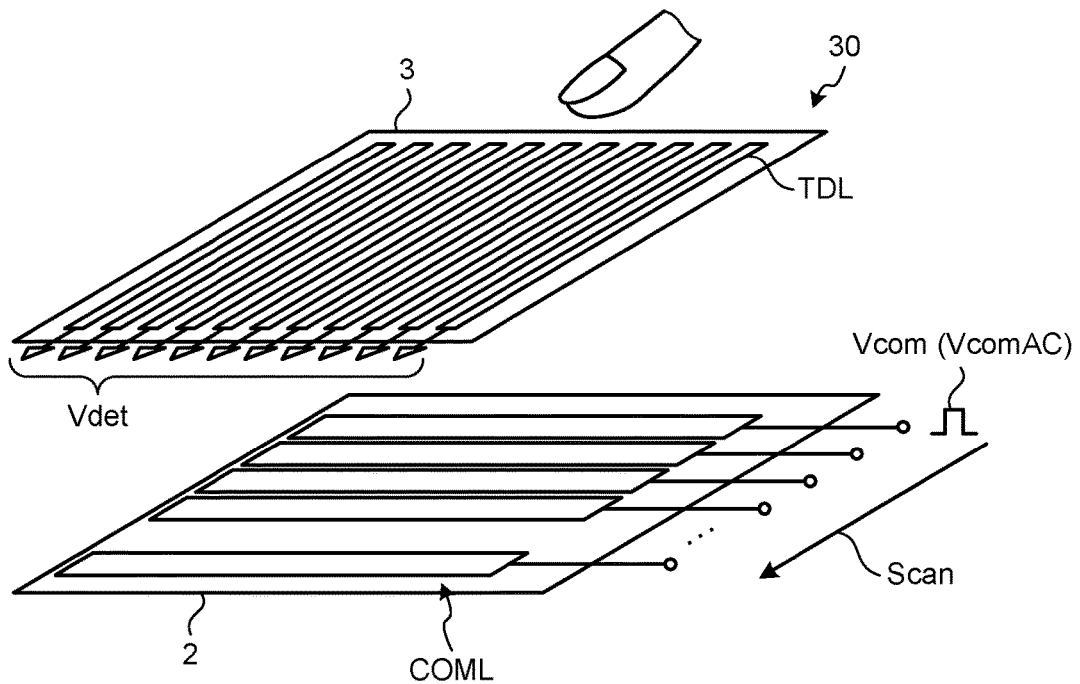
FIG. 10 is a perspective view of an exemplary configuration of drive electrodes and touch detection electrodes in the display unit with a touch detection function.

FIG. 10 is a perspective view of an exemplary configuration of the drive electrodes and the touch detection electrodes in the display unit with a touch detection function. The drive electrodes COML according to the present embodiment function as drive electrodes of the liquid-crystal display device 20 and as drive electrodes of the touch detecting device 30. The drive electrodes COML illustrated in FIG. 10 face the pixel electrodes in the direction perpendicular to the surface of the TFT substrate 21. The touch detecting device 30 includes the drive electrodes COML provided to the pixel substrate 2 and the touch detection electrodes TDL provided to the counter electrode 3. The touch detection electrodes TDL are striped electrode patterns extending in a direction intersecting with the extending direction of the electrode patterns of the drive electrodes COML. The touch detection electrodes TDL face the drive electrodes COML in the direction perpendicular to the surface of the TFT substrate 21. Each of the electrode patterns of the touch detection electrodes TDL is coupled to an input terminal of the touch detection signal amplifying unit 42 of the touch detecting unit 40. The electrode patterns of the drive electrodes COML and the touch detection electrodes TDL intersecting with each other have capacitance at the intersections. In the touch detecting device 30, the drive electrode driver 14 applies the drive signal VcomAC to the drive electrodes COML. As a result, the touch detection electrodes TDL output the touch detection signals Vdet. Thus, touch detection is performed. In other words, the drive electrodes COML correspond to the drive electrode E1 in the basic principle of touch detection illustrated in FIGS. 2 to 6, whereas the touch detection electrodes TDL correspond to the touch detection electrode E2. The touch detecting device 30 detects a touch according to the basic principle. As described above, the touch detecting device 30 includes the touch detection electrodes TDL that generate capacitance with one of the first electrodes and the second electrodes (e.g., the drive electrodes COML serving as the second electrodes). Based on a change in the capacitance, the touch detecting device 30 detects a touch.

As illustrated in FIG. 10, the electrode patterns intersecting with each other serve as a capacitive touch sensor formed in a matrix. By scanning the entire touch detection surface, the touch detecting device 30 can detect the position where a contact or proximity of an external proximity object is made. Specifically, to perform a touch detection operation in the touch detecting device 30, the drive electrode driver 14 linearly sequentially scans each drive electrode block B illustrated in FIG. 7 in a time-division manner. As a result, each drive electrode block B (one detection block) of the drive electrodes COML is sequentially selected in a scanning direction Scan. Subsequently, the touch detecting device 30 outputs the touch detection signals Vdet from the touch detection electrodes TDL. The touch detecting device 30 thus performs touch detection on one detection block.

While the relation between the number of detection blocks and the number of lines in display output may be any desired relation, one detection block according to the present embodiment is a touch detection area corresponding to the display area Ad of two lines. To perform touch detection in a touch detection area corresponding to one of the two lines constituting one detection block, the detection block is driven without any change. In other words, the touch detecting device 30 performs an operation for touch detection on a touch detection area including one line on which touch detection is desired to be performed and one line on which touch detection is not necessarily to be performed. Let us assume a case where one detection block is a touch detection area corresponding to the display area Ad of three or more lines. Also in this case, the touch detecting device 30 performs an operation for touch detection in part of the touch detection area in the same manner as described above.

The touch detection electrodes TDL or the drive electrodes COML (drive electrode blocks) do not necessarily have a striped pattern in which a plurality of electrodes are separated. The touch detection electrodes TDL or the drive electrodes COML (drive electrode blocks) may have a comb shape, for example. The touch detection electrodes TDL or the drive electrodes COML (drive electrode blocks) simply need to have a pattern divided into a plurality of pieces. The shape of slits that separate the drive electrodes COML may be a straight line or a curved line.

Figure 11:
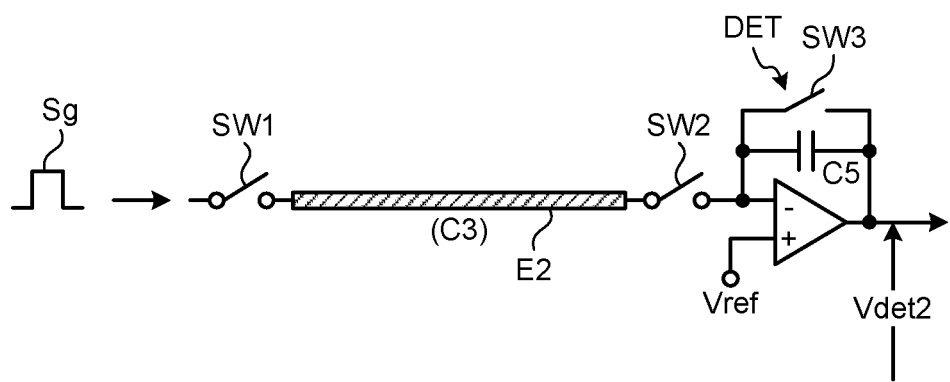
FIG. 11 is a diagram for explaining the basic principle of self-capacitive touch detection and illustrates a state where no finger is in contact with or in proximity to the touch detection electrode.
Figure 12:
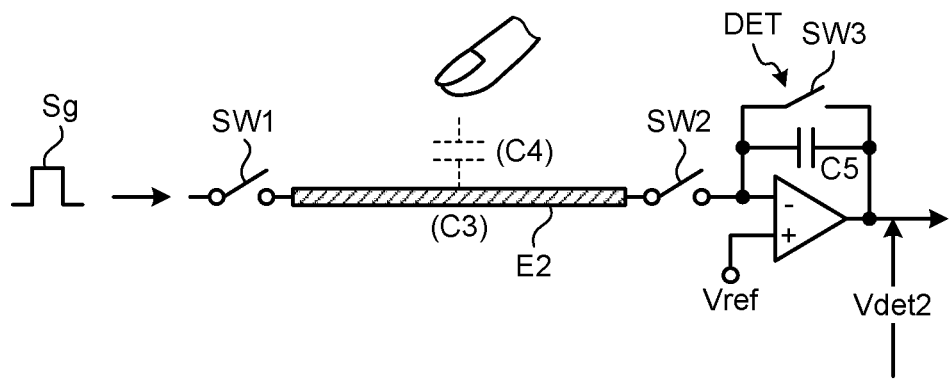
FIG. 12 is a diagram for explaining the basic principle of self-capacitive touch detection and illustrates a state where a finger is in contact with or in proximity to the touch detection electrode.
Figure 13:
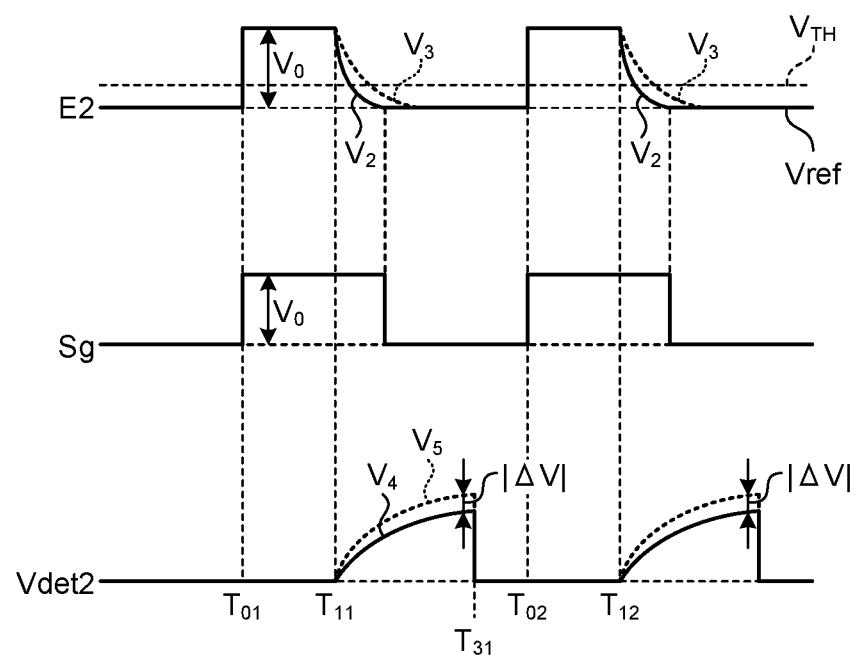
FIG. 13 is a diagram of an example of waveforms of the drive signal and the touch detection signal.

While the basic principle of the technology for touch detection according to the present embodiment is what is called mutual-capacitive touch detection that is described with reference to FIGS. 2 to 6, it may be another technology. The technology for touch detection may be self-capacitive touch detection, for example. The following describes the basic principle of self-capacitive touch detection with reference to FIGS. 11 to 13. FIG. 11 is a diagram for explaining the basic principle of self-capacitive touch detection and illustrates a state where no finger is in contact with or in proximity to the touch detection electrode. FIG. 12 is a diagram for explaining the basic principle of self-capacitive touch detection and illustrates a state where a finger is in contact with or in proximity to the touch detection electrode. FIG. 13 is a diagram of an example of waveforms of the drive signal and the touch detection signal. FIGS. 11 and 12 also illustrate a detection circuit.

As illustrated in FIG. 11, in a state where no finger is in contact with or in proximity to the touch detection electrode, the AC rectangular wave Sg having a predetermined frequency (e.g., approximately several kilohertz to several hundred kilohertz) is applied to the touch detection electrode E2. The touch detection electrode E2 has capacitance C3, and an electric current depending on the capacitance C3 flows. The voltage detector DET converts change in the electric current depending on the AC rectangular wave Sg into change in the voltage (solid waveform $V_4$ (refer to FIG. 13)).

As illustrated in FIG. 12, in a state where a finger is in contact with or in proximity to the touch detection electrode, capacitance C4 between the finger and the detected touch is added to the capacitance C3 of the touch detection electrode E2. When the AC rectangular wave Sg is applied to the touch detection electrode E2, an electric current depending on the capacitance C3 and C4 flows. As illustrated in FIG. 13, the voltage detector DET converts change in the electric current depending on the AC rectangular wave Sg into change in the voltage (dotted waveform $V_5$). The voltage detector DET integrates the voltage values of the obtained waveforms $V_4$ and $V_5$ to compare these values, thereby determining whether a finger is in contact with or in proximity to the touch detection electrode E2. The touch detecting unit 40 does not necessarily employ the technology described above and may compare the voltage values without integrating them. As illustrated in FIG. 13, the touch detecting unit 40 may derive respective periods of time until the voltage decreases to a predetermined reference voltage in a waveform $V_2$ and a waveform $V_3$ and compare the periods of time, for example.

Specifically, as illustrated in FIGS. 11 and 12, the touch detection electrode E2 can be separated by a switch SW1 and a switch SW2. In FIG. 13, the voltage level of the AC rectangular wave Sg increases to a voltage level of a voltage $V_0$ at a timing of time $T_{01}$. At this time, the switch SW1 is turned ON, and the switch SW2 is turned OFF. As a result, the voltage of the touch detection electrode E2 also increases to the voltage $V_0$. Subsequently, the switch SW1 is turned OFF before a timing of time $T_{11}$. At this time, the touch detection electrode E2 is in a floating state. The electric potential of the touch detection electrode E2, however, is maintained at $V_0$ by the capacitance C3 (refer to FIG. 11) of the touch detection electrode or capacitance obtained by adding the capacitance C4 generated by contact or proximity of a finger or the like to the capacitance C3 of the touch detection electrode (C3+C4, refer to FIG. 12). Subsequently, a switch SW3 is turned ON before the timing of time $T_{11}$ and then turned OFF after a predetermined period of time elapses, thereby resetting the voltage detector DET. The reset operation makes the output voltage substantially equal to Vref.

Subsequently, the switch SW2 is turned ON at the timing of time $T_{11}$, and then the voltage of an inversion input unit in the voltage detector DET increases to the voltage $V_0$ of the touch detection electrode E2. After that, the voltage of the inversion input unit in the voltage detector DET decreases to the reference voltage Vref according to a time constant of the capacitance C3 (or C3+C4) of the touch detection electrode E2 and a time constant of capacitance C5 in the voltage detector DET. At this time, output from the voltage detector DET increases (Vdet2) because the electric charge accumulated in the capacitance C3 (or C3+C4) of the touch detection electrode E2 transfers to the capacitance C5 in the voltage detector DET. When no finger or the like is in proximity to the touch detection electrode E2, the output from the voltage detector DET (Vdet2) is represented by the solid waveform $V_4$, and Vdet2=$C3 \cdot V_0/C5$ is satisfied. When capacitance generated by effect of a finger or the like is added, the output from the voltage detector DET (Vdet2) is represented by the dotted waveform $V_5$, and Vdet2=(C3+C4)$\cdot V_0$/C5 is satisfied. Subsequently, at a timing of time $T_{31}$ after the electric charge in the capacitance C3 (or C3+C4) of the touch detection electrode E2 sufficiently transfers to the capacitance C5, the switch SW2 is turned OFF, and the switches SW1 and SW3 are turned ON. This operation reduces the electric potential of the touch detection electrode E2 to a level as low as that of the AC rectangular wave Sg and resets the voltage detector DET. The switch SW1 may be turned ON at any timing after the switch SW2 is turned OFF and before time $T_{02}$. The voltage detector DET may be reset at any timing after the switch SW2 is turned OFF and before time $T_{12}$. The operations described above are repeatedly performed at a predetermined frequency (e.g., approximately several kilohertz to several hundred kilohertz). The touch detecting unit 40 can detect presence of an external proximity object (presence of a touch) based on an absolute value $|\Delta V|$ of the difference between the waveform $V_4$ and the waveform $V_5$. As illustrated in FIG. 13, the electric potential of the touch detection electrode E2 is represented by the waveform $V_2$ when no finger or the like is in proximity to the touch detection electrode and by the waveform $V_3$ when C4 generated by effect of a finger or the like is added. The touch detecting unit 40 may detect presence of an external proximity object (presence of a touch) by measuring a time until the waveforms $V_2$ and $V_3$ decrease to a predetermined voltage $V_{TH}$.

Figure 14:
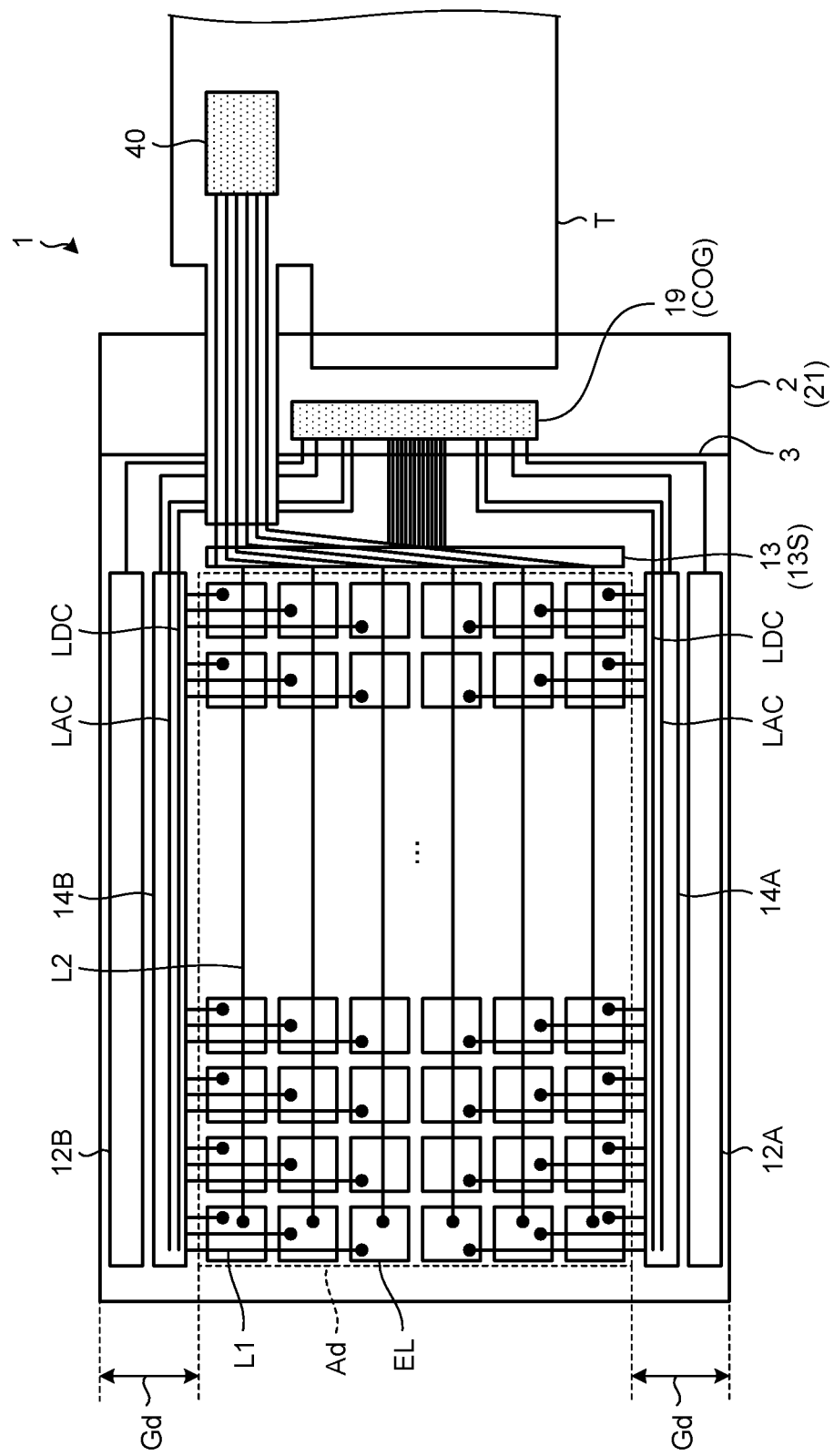
FIG. 14 is a diagram of another example of the module in which the display device with a touch detection function is installed.

FIG. 14 is a diagram of another example of the module in which the display device with a touch detection function is installed. In a case where self-capacitive touch detection is employed as touch detection, electrodes EL arranged in a matrix may be used as electrodes having both of the functions of the touch detection electrodes TDL and the drive electrodes COML. In this case, the electrodes EL are coupled to the drive electrode scanning units 14A and 14B and the touch detecting unit 40 via coupling portions, such as wiring L1 and L2, respectively. While the wiring L2 is provided to only a part of the electrodes EL in FIG. 14, the wiring L2 or coupling portions similar thereto is provided to all the electrodes EL in the actual configuration. The shape and the size of the electrodes EL may be any desired shape and size. The size of the electrodes EL may correspond to that of the pixel, for example. In this case, one of the electrodes constituting a pixel (e.g., the pixel electrode 22 in a pixel of the liquid-crystal display device or the drive electrode COML serving as a counter electrode) may be used as the electrode EL. In other words, the touch detection electrodes EL may be also used as electrodes provided to respective pixels of the display device including a plurality of pixels.

Figure 15:
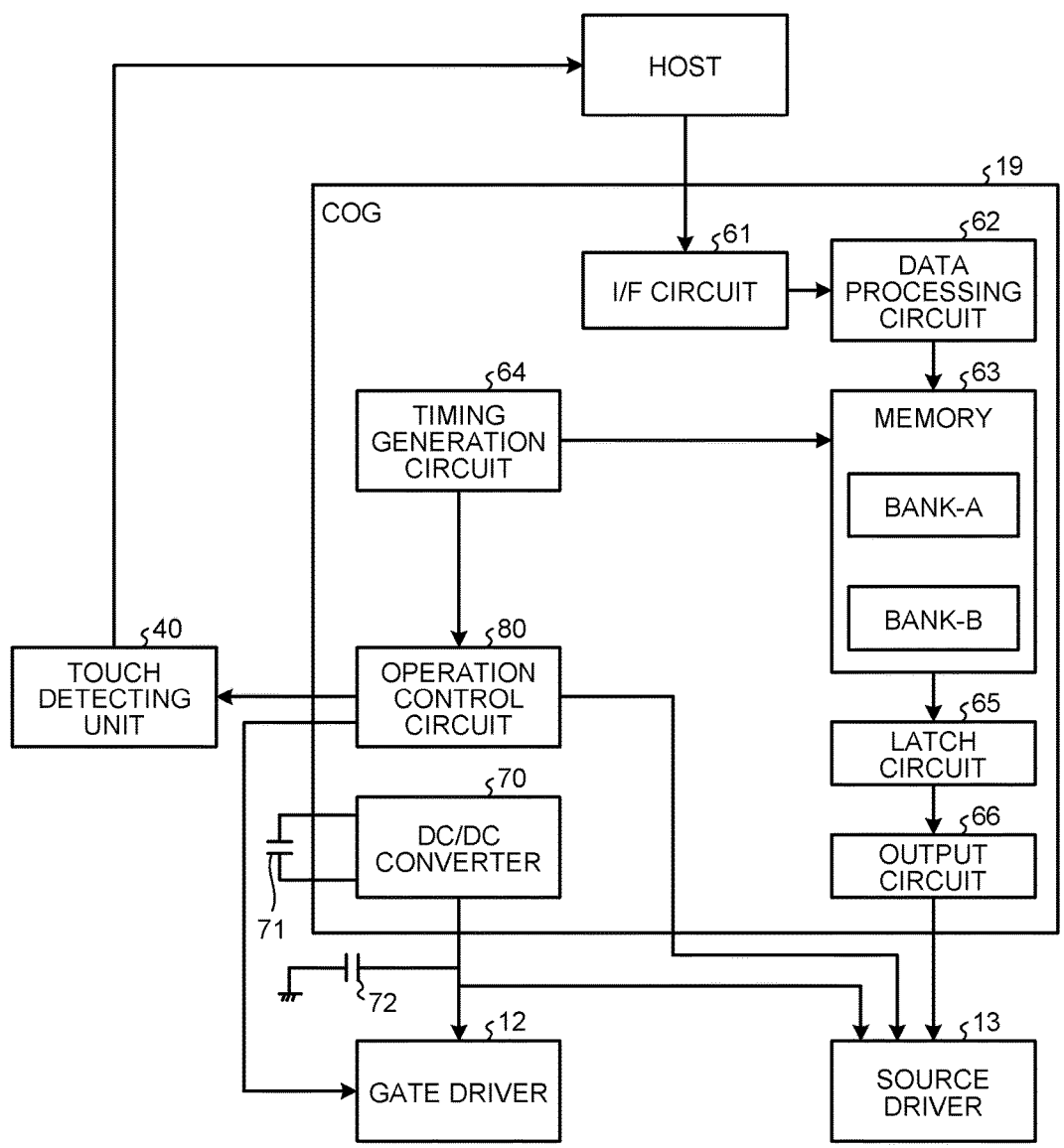
FIG. 15 is a block diagram of a relation between functions of COG and main components coupled to the COG.

FIG. 15 is a block diagram of a relation between functions of the COG 19 and main components coupled to the COG. The COG 19 includes an interface (I/F) circuit 61, a data processing circuit 62, a memory 63, a timing generation circuit 64, a latch circuit 65, an output circuit 66, a DC/DC converter 70, and an operation control circuit 80.

The I/F circuit 61 functions as an interface that couples the host to the COG 19 and receives the video signals Vdisp output from the host. The data processing circuit 62 outputs the pixel signals Vpix to the memory 63 in the form of data in units of lines composed of a series of pixel signals Vpix for pixels of one line aligned in the row direction obtained based on the video signals Vdisp. The host is a control device included in an electronic apparatus provided with the display device 1 with a touch detection function, for example. The host includes a circuit that determines the display output contents of the liquid-crystal display device 20 and performs various processing based on the result of touch detection performed by the touch detecting device 30.

The memory 63 stores therein data in units of lines output from the data processing circuit 62. In other words, the memory 63 according to the present embodiment stores therein data on an image to be displayed by the liquid-crystal display device 20 in units of lines, the liquid-crystal display device 20 serving as the display unit. Specifically, the memory 63 is a partial random access memory (partial RAM) including a plurality of (e.g., two) storage areas in which data of a predetermined number of lines is stored, for example. It is possible to perform read and write operations on the storage areas individually. Thus, the memory 63 includes a plurality of storage areas on which read and write operations can be performed individually. In FIG. 15 and other figures, two storage areas included in the memory 63 are referred to as "BANK-A" and "BANK-B". In the following description, the two storage areas may be distinguished from each other by the terms described above. The memory 63 may include three or more storage areas.

The data is written in BANK-A and BANK-B of the memory 63 alternately. The amount of data (number of lines) written in BANK-A may be different from that written in BANK-B. During writing data in one of BANK-A and BANK-B, data already written in the other of them can be read out.

The time required to read data from the memory 63 is shorter than that required to write data to the memory 63. Specifically the time required to reading data from BANK A and BANK-B is half of the time required to write data thereto. As a result, data of four lines can be read out from BANK-A in a half time (2) of a time (4) to write the data of four lines to BANK-A (refer to FIG. 19 and other figures), for example.

The timing generation circuit 64 is what is called a clock generator, for example, and outputs clock signals at a predetermined cycle. Inputting data to the memory 63 and outputting data from the memory 63 are performed at timings corresponding to the clock signals. The latch circuit 65 holds data in units of lines output from the memory 63 before outputting the data to the output circuit 66. The output circuit 66 outputs, to the source driver 13, data in units of lines output from the memory 63 and held by the latch circuit 65.

The DC/DC converter 70 functions as a power supply unit that supplies electric power to the display unit 10 with a touch detection function. Specifically, the DC/DC converter 70 includes a charge pump provided with a capacitor (e.g., capacitors 71 and 72 illustrated in FIG. 15 and other figures) outside the COG 19. The charge pump causes a direct current to flow through the source driver 13, the gate driver 12, and other components at a voltage based on a voltage Va from a direct-current (DC) power supply (refer to FIGS. 16 to 18) coupled to the COG 19.

Figure 16:
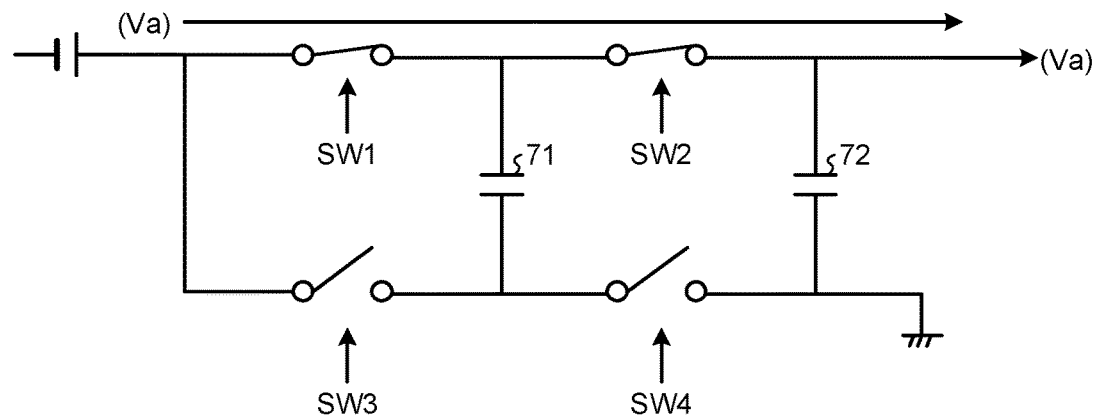
FIG. 16 is a schematic diagram for explaining functions of a charge pump included in a DC/DC converter.
Figure 17:
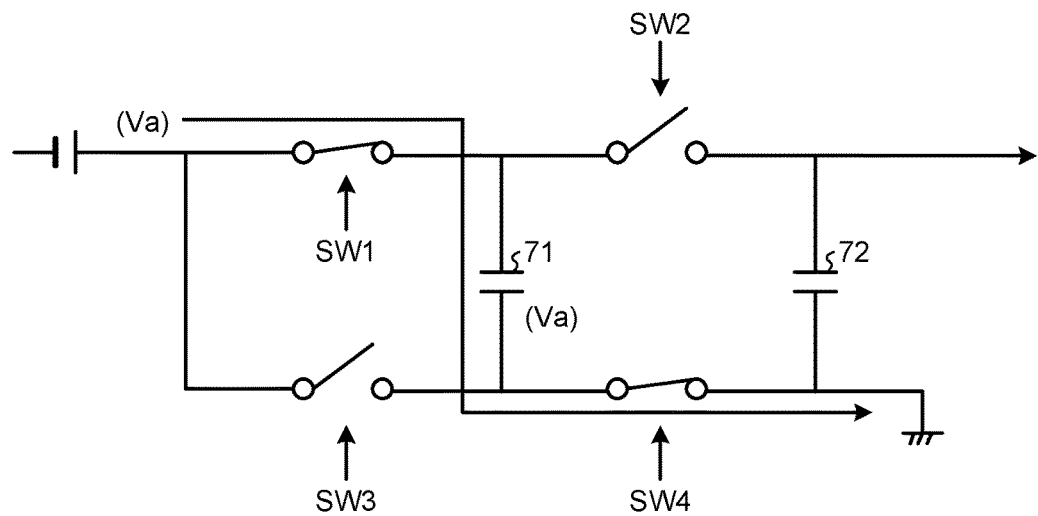
FIG. 17 is another schematic diagram for explaining functions of the charge pump included in the DC/DC converter.
Figure 18:
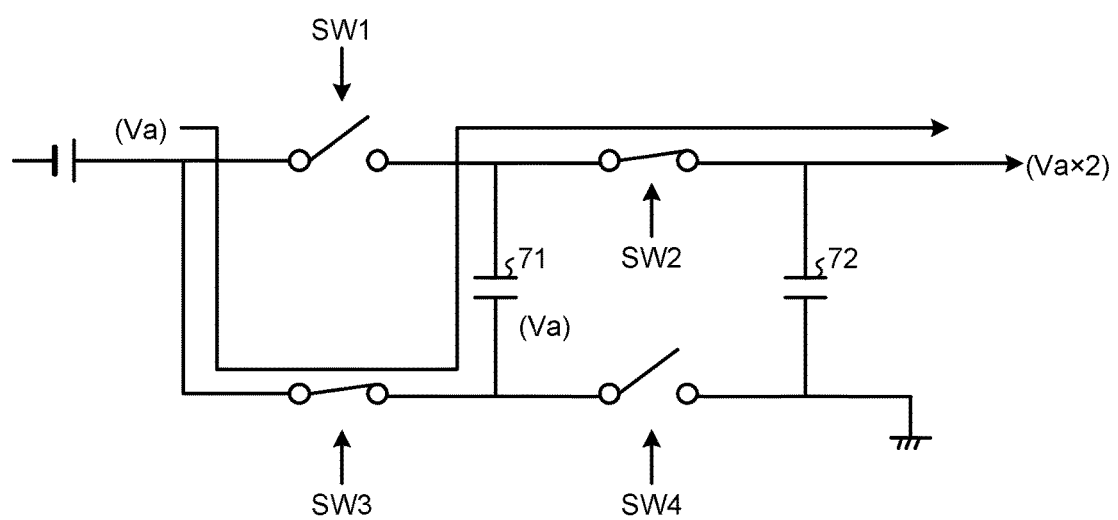
FIG. 18 is still another schematic diagram for explaining functions of the charge pump included in the DC/DC converter.

FIGS. 16 to 18 are schematic diagrams for explaining functions of the charge pump included in the DC/DC converter 70. The charge pump includes wiring bifurcating from the power supply. A first wiring of the bifurcating wiring is coupled to an output side serving as a destination of an electric current, such as the source driver 13 and the gate driver 12. A second wiring thereof is coupled to a ground potential. The first wiring and second wiring are each provided with two switches in series. In FIGS. 16 to 18, the switches provided to the first wiring are denoted by SW1 and SW2 from the side closer to the DC power supply. The switches provided to the second wiring are denoted by SW3 and SW4 from the side closer to the DC power supply.

The capacitors 71 and 72 are provided in a manner coupling between the bifurcating wiring. Specifically, the capacitor 71 is provided between the wiring that couples the switch SW1 and the switch SW2 and the wiring that couples the switch SW3 and the switch SW4. The capacitor 72 is provided in a manner coupling the first wiring and second wiring at the downstream side of the switch SW2 and the switch SW4.

When the switches SW1 and SW2 are turned ON and the switches SW3 and SW4 are turned OFF as illustrated in FIG. 16, the charge pump causes an electric current corresponding to the voltage Va of the DC power supply to flow. By contrast, when the switches SW1 and SW4 are turned ON and the switches SW2 and SW3 are turned OFF as illustrated in FIG. 17, the charge pump charges the capacitor 71 with capacitance corresponding to the voltage Va. When the switches SW2 and SW3 are turned ON and the switches SW1 and SW4 are turned OFF after the charge of the capacitor 71 as illustrated in FIG. 18, the DC power supply and the capacitor 71 are coupled in series to the output side. As a result, a voltage (Va×2) of the DC power supply and the capacitor 71 is applied to the output side, and an electric current corresponding to the voltage flows through the source driver 13 and the gate driver 12. The capacitor 72 functions as a smoothing capacitor.

As described above with reference to FIGS. 16 to 18, the DC/DC converter 70 can adjust the voltage by the operation of the charge pump. FIGS. 16 to 18 and the description with reference to FIGS. 16 to 18 are schematic explanations of the operating principle of the charge pump. The charge pump provided to the DC/DC converter 70 does not necessarily have the configuration illustrated in FIGS. 16 to 18. With the circuit configuration having a multistage charge pump or the like based on the principle of the charge pump described above, the DC/DC converter 70 can output a voltage adjusted based on the voltage required for various operations performed by the display unit 10 with a touch detection function.

While the capacitors 71 and 72 are ceramic capacitors, for example, they may be capacitors of other types, such as tantalum capacitors. The types of the capacitors 71 and 72 depend on the capacitance required by the charge pump. The DC/DC converter 70 according to the present embodiment includes a charge pump provided with ceramic capacitors.

The display unit 10 with a touch detection function according to the present embodiment performs display of an image with the liquid-crystal display device 20 and touch detection with the touch detecting device 30 alternately in a display period of an image of one frame under the control of the operation control circuit 80, which will be described later. The frame rate of the liquid-crystal display device 20 may be any desired rate, and it may be 60 fps or 120 fps, for example, or another frame rate.

The power consumption of the display unit 10 with a touch detection function significantly varies between the timing at which display processing of an image is performed by the liquid-crystal display device 20 and the timing at which the display processing is not performed. As a result, the output from the DC/DC converter 70 significantly varies between the timing at which the display processing is performed and the timing at which the display processing is not performed.

Ceramic capacitors expand and contract with charge and discharge. The expansion and contraction vibrates a component, such as a substrate, provided with the ceramic capacitors. If the expansion and contraction periodically occur, the vibrations are periodically generated, thereby generating audible sound. Periodic execution of the display processing with periodic expansion and contraction of the ceramic capacitors causes squeaking. Even if the capacitors of the charge pump are not ceramic capacitors, periodic execution of the display processing may possibly generate noise that affects the operation of the display device 1 with a touch detection function, such as a display stripe at each divided block and effect on a touch detection result caused by radiant noise at a divided block period.

To address this, the operation control circuit 80 according to the present embodiment performs operation control for reducing the squeaking and the noise. The operation control circuit 80 is provided to the COG 19 and performs functions of the control unit 11. Specifically, the operation control circuit 80 supplies control signals to the gate driver 12, the source driver 13, and other components, thereby controlling the operation timing of the liquid-crystal display device 20 serving as the display unit. The operation control circuit 80 supplies control signals to the touch detecting unit 40, thereby controlling the operation timing of the touch detecting device 30 serving as a detecting unit. Specifically, the operation control circuit 80 controls the timings to output the display drive voltage VcomDC and the drive signal VcomAC, for example.

More specifically, the operation control circuit 80 performs display processing and touch detection processing alternately a plurality of times in a display period of an image of one frame. The display processing is processing of performing control on an electric charge, e.g., control on a voltage to be applied to the liquid-crystal layer 6 via the first electrodes and the second electrodes (the pixel electrodes 22 and the drive electrodes COML). The touch detection processing is processing of performing touch detection. The operation control circuit 80 varies the length of a first period, the length of a second period, or both in display periods of images of two frames that are displayed consecutively. The first period is a period in which the display processing is performed once, and the second period is a period in which the touch detection processing is performed once.

Figure 19:
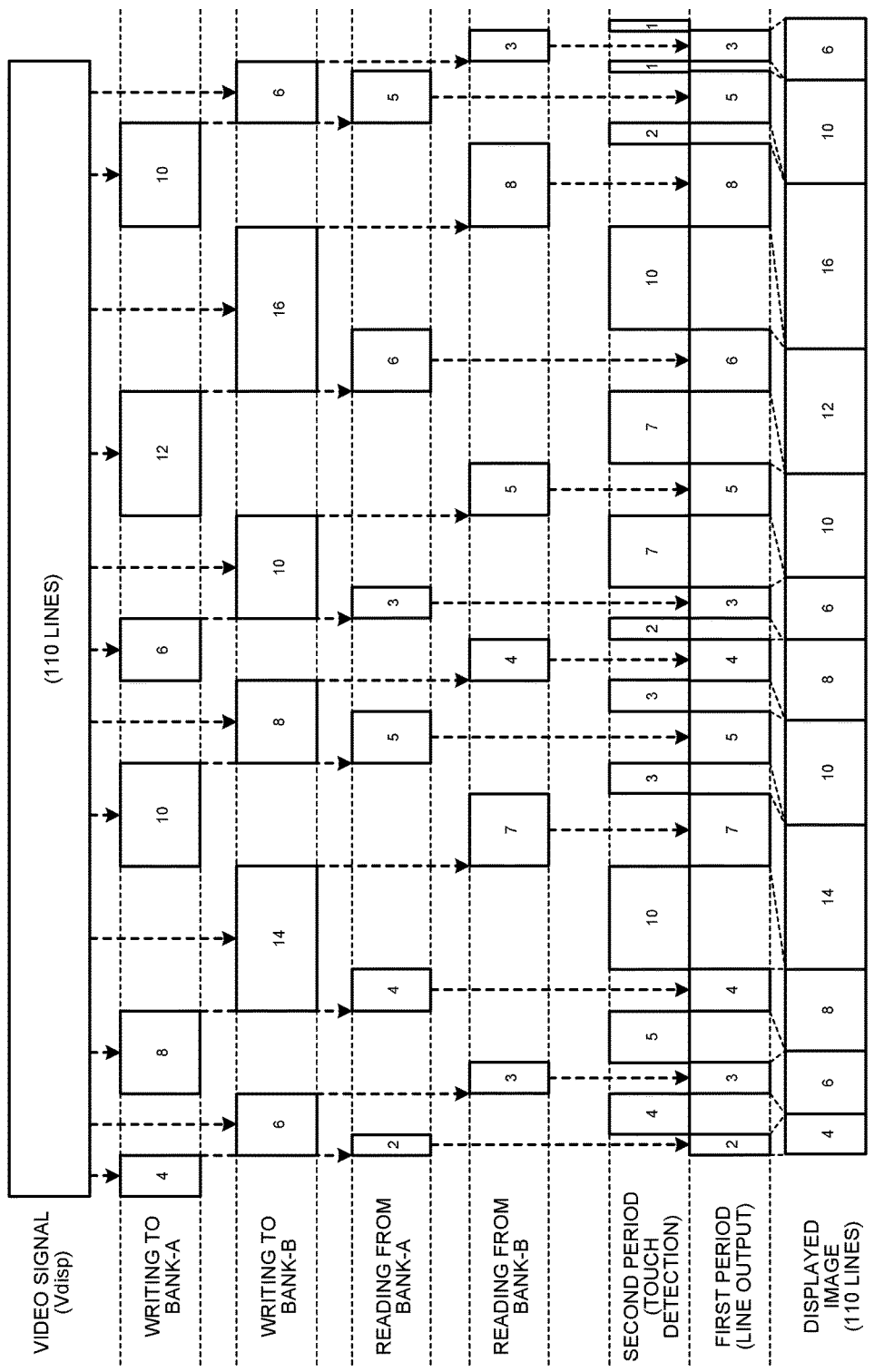
FIG. 19 is a timing chart of an example of a relation between a first period and a second period.

FIG. 19 is a timing chart of an example of a relation between the first period and the second period. With reference to FIG. 19 and other figures, an explanation will be made of display output corresponding to the video signals Vdisp of 110 lines and touch detection performed with the display output, for example.

The operation control circuit 80 according to the present embodiment varies the lengths of the first period and the second period in a display period of an image of one frame. The first period is a period for the display processing that is performed a plurality of times in a manner sandwiching the second period for the touch detection processing between two first periods. As illustrated in FIG. 19, for example, the operation control circuit 80 changes the length of the first period to: four lines (2), six lines (3), eight lines (4), fourteen lines (7), ten lines (5), eight lines (4), six lines (3), ten lines (5), twelve lines (6), sixteen lines (8), ten lines (5), and six lines (3), for example. The operation control circuit 80 thus varies the length of the first period every time. As described above, the time required for reading data from the memory 63 is half of the time required for writing data thereto. Therefore, in a case where the cycle of the clock signals and the time required to write data of one line are combined, reading of data of two lines and displaying the read-out data can be performed in one cycle. As described above, by the control of the operation control circuit 80 in the display processing, the data is read from the memory 63 in units of lines. The minimum unit of the first period corresponds to a period for reading data of one or a plurality of lines (e.g., two lines). The odd-numbered first period is a first period for the display processing to be performed by reading data written in BANK-A. The even-numbered first period is a first period for the display processing to be performed by reading data written in BANK-B. The operation control circuit 80 outputs the control signals corresponding to the first period to the gate driver 12, the source driver 13, and other components, thereby operating the liquid-crystal display device 20.

Which line in the display area Ad is output at which timing is freely determined. As illustrated in FIG. 19, for example, display output may be performed in units of lines sequentially from one end to the other end. Alternatively, display output may be performed in units of lines intermittently like what is called interlaced output.

The operation control circuit 80 operates the liquid-crystal display device 20 so as to vary the first period as described above. This operation makes a change aperiodic in the power consumption of the display unit 10 with a touch detection function between the timing at which the display processing of an image is performed by the liquid-crystal display device 20 and the timing at which the display processing is not performed. As a result, squeaking does not occur in a configuration including ceramic capacitors in the charge pump like the present embodiment. Even if noise is generated, the noise is also aperiodically generated. The aperiodic noise can readily disperse its effect under uncertain circumstances compared with periodic noise, thereby preventing the effect of the noise from manifesting itself.

The second period is a period for the touch detection processing performed alternately with the display processing of the first period. The operation control circuit 80 varies the length of the second period every time. For example, the operation control circuit 80 changes the length of the second period to: four detection blocks (4), five detection blocks (5), ten detection blocks (10), three detection blocks (3), three detection blocks (3), two detection blocks (2), seven detection blocks (7), seven detection blocks (7), ten detection blocks (10), two detection blocks (2), one detection block (1), and one detection blocks (1). The operation control circuit 80 thus varies the length of the second period intermittently. The operation control circuit 80 outputs the control signal corresponding to the second period to the touch detecting unit 40, thereby operating the touch detecting device 30. In FIG. 19 and other figures, the time indicated by the value of the length of the second period corresponding to the touch detection period is equivalent to the time indicated by the value of the length of the first period.

The length of the second period according to the present embodiment corresponds to the size of an area in which the touch detection processing is performed. In other words, the value indicating the length of the second period corresponds to the number of detection blocks. As described above, one detection block corresponds to a display area of two lines. Since the total length of the second period described above is represented by a value of 55, the touch detecting device 30 can perform touch detection corresponding to a display area of 110 lines. Which touch detection block is output at which timing is freely determined and may be determined based on the same rule as the rule in the outputting of a line in the display area Ad, for example.

The second period according to the present embodiment is set based on the time for writing data to the memory 63 performed in parallel therewith. In FIG. 19, the second period having a length of 4 follows the earliest first period having a length of 2 for the display processing of four lines. The length (4) of the second period is equal to a length obtained by subtracting the length (2) of the first period from the time (6) for writing data of six lines to BANK-B, the writing being performed in parallel with the second period. As described above, the length of the second period according to the present embodiment is equal to a length obtained by subtracting a time for read operation from a time for write operation that is performed in parallel with the read operation. By setting the second period in this manner, the display device 1 with a touch detection function of the present embodiment can alternately perform the display processing and the touch detection processing with no interval interposed therebetween. This can reduce the total length of time required for the display processing and the touch detection processing.

In display periods of a plurality of frames that are displayed consecutively, the operation control circuit 80 may repeatedly use the pattern in which the lengths of the first period and the second period are caused to vary in a display period of an image of one frame illustrated in FIG. 19 as a predetermined pattern in every frame. Alternatively, the operation control circuit 80 may vary the lengths of the first period and the second period in every frame.

Figure 20:
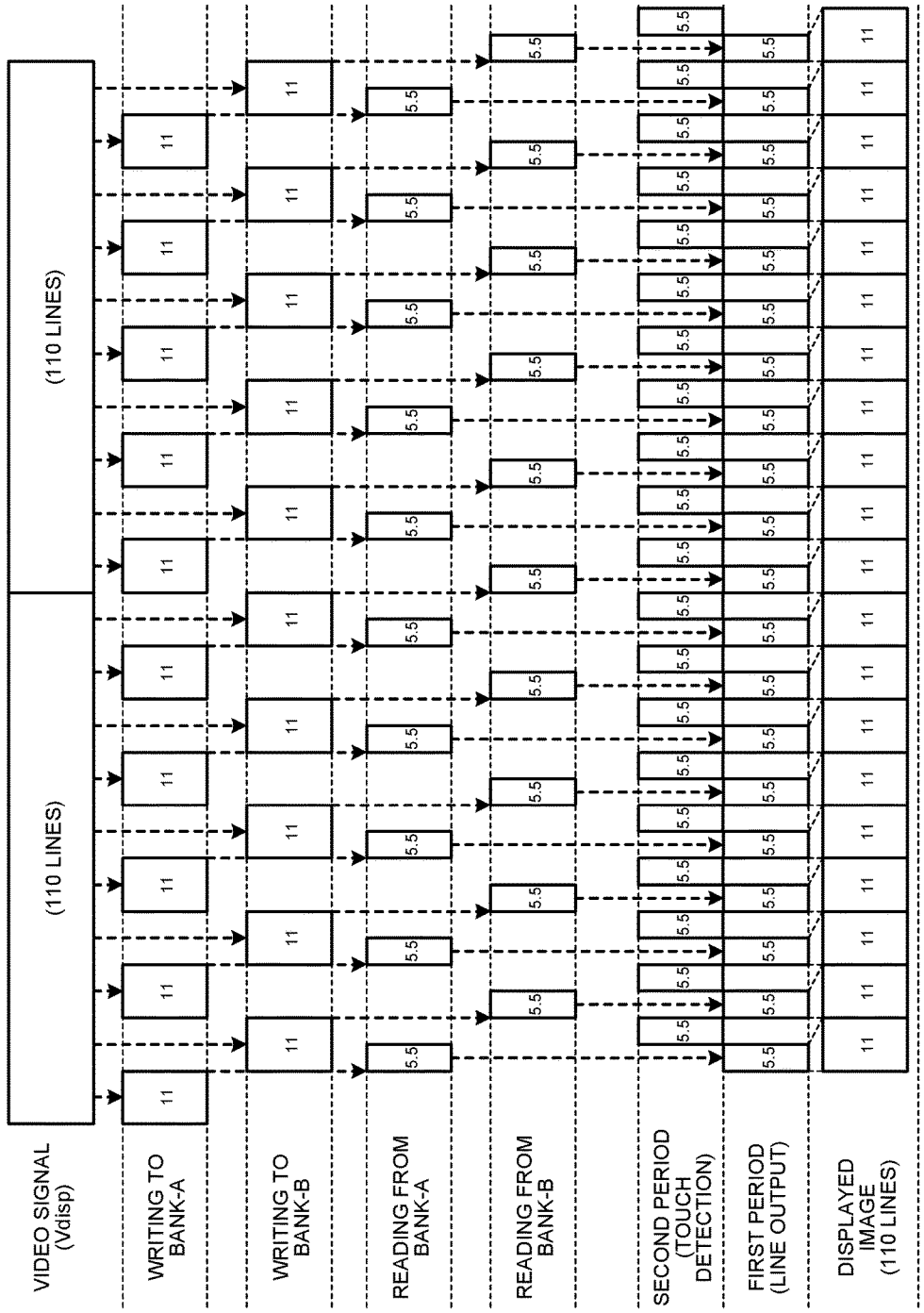
FIG. 20 is a timing chart of an example of a relation between a periodic first period and a periodic second period.

FIG. 20 is a timing chart of an example of a relation between a periodic first period and a periodic second period. The conventional display device with a touch detection function periodically repeats the display processing and the touch detection processing. Specifically, as illustrated in FIG. 20, the conventional display device with a touch detection function, for example, alternately and periodically performs the display processing of the first period having a length of 5.5 and touch detection processing of the second period having a length of 5.5. In this case, the first period having a length of 5.5 is a period for display processing of 11 lines of the image, and the second period having a length of 5.5 is a period for touch detection processing of 5.5 detection blocks that is performed after the display processing. This mechanism makes a change periodic in the power consumption between the timing at which the display processing of an image is performed and the timing at which the display processing is not performed, thereby causing periodic noise. Furthermore, squeaking occurs in a case where ceramic capacitors are provided to the charge pump. By contrast, in the present embodiment, the aperiodic first period is set as illustrated in FIG. 19, for example, thereby making a change in the power consumption aperiodic, and solving the problems described above.

In a case where consecutive first periods are referred to as a 1-1 period and a 1-2 period, respectively, for example, and where the data amount of the 1-1 period is 12 and the data amount of the 1-2 period is 4, the period for reading data of the 1-1 period is 12×1/2=6. In this case, writing data of 4 in the 1-2 period is finished within the time for reading data of 6. As a result, a period for an amount of data of 6−4=2 corresponds to a period in which no writing or no reading is performed. If this situation does not occur, it is possible to read data in a period of 55 corresponding to a half of the total amount of data of 110 and can define the other half (period of 55) as the second period. By contrast, if the situation described above occurs, a time for reading data of a period of 55+2 is required, thereby changing the relation between the first period and the second period. To address this, when the time for reading data is 1/n of the time for writing data, the operation control circuit 80 according to the present embodiment preferably performs control so as to satisfy a×(1/n)≤b where a is a time for writing data of a 1−m-th period and b is a period for writing data of a 1−(m+1)-th period.

As described above, the operation control circuit 80 according to the present embodiment varies the length of the first period, the length of the second period, or both in display periods of images of two frames that are displayed consecutively, thereby making the first period aperiodic. The display device 1 with a touch detection function according to the present embodiment thus can reduce periodic generation of noise. Because periodic generation of noise is reduced, the display device 1 with a touch detection function according to the present embodiment can improve the accuracy in display and touch detection.

The operation control circuit 80 according to the present embodiment also varies the lengths of the first period and the second period in a display period of an image of one frame, thereby making the first period aperiodic in the display period of the image of one frame. As a result, the aperiodicity for suppressing periodic generation of noise is secured in the display period of the image of one frame. Thus it is possible to reduce periodic generation of noise more reliably.

The memory 63 includes a plurality of storage areas (e.g., BANK-A and BANK-B) on which read and write operations can be performed individually. The memory 63 requires a shorter time to read data than to write data, and the first period corresponds to a period for reading data of one or a plurality of lines. This configuration can allot a time corresponding to the difference between the time required to write data and the time required to read data to the second period. As a result, the display processing and the touch detection processing are alternately performed with no interval interposed therebetween, and thereby the total length of time required for the display processing and the touch detection processing is reduced. Setting the first period and the second period in units of lines can facilitate control for the display processing and the touch detection processing.

Modifications

Figure 21:
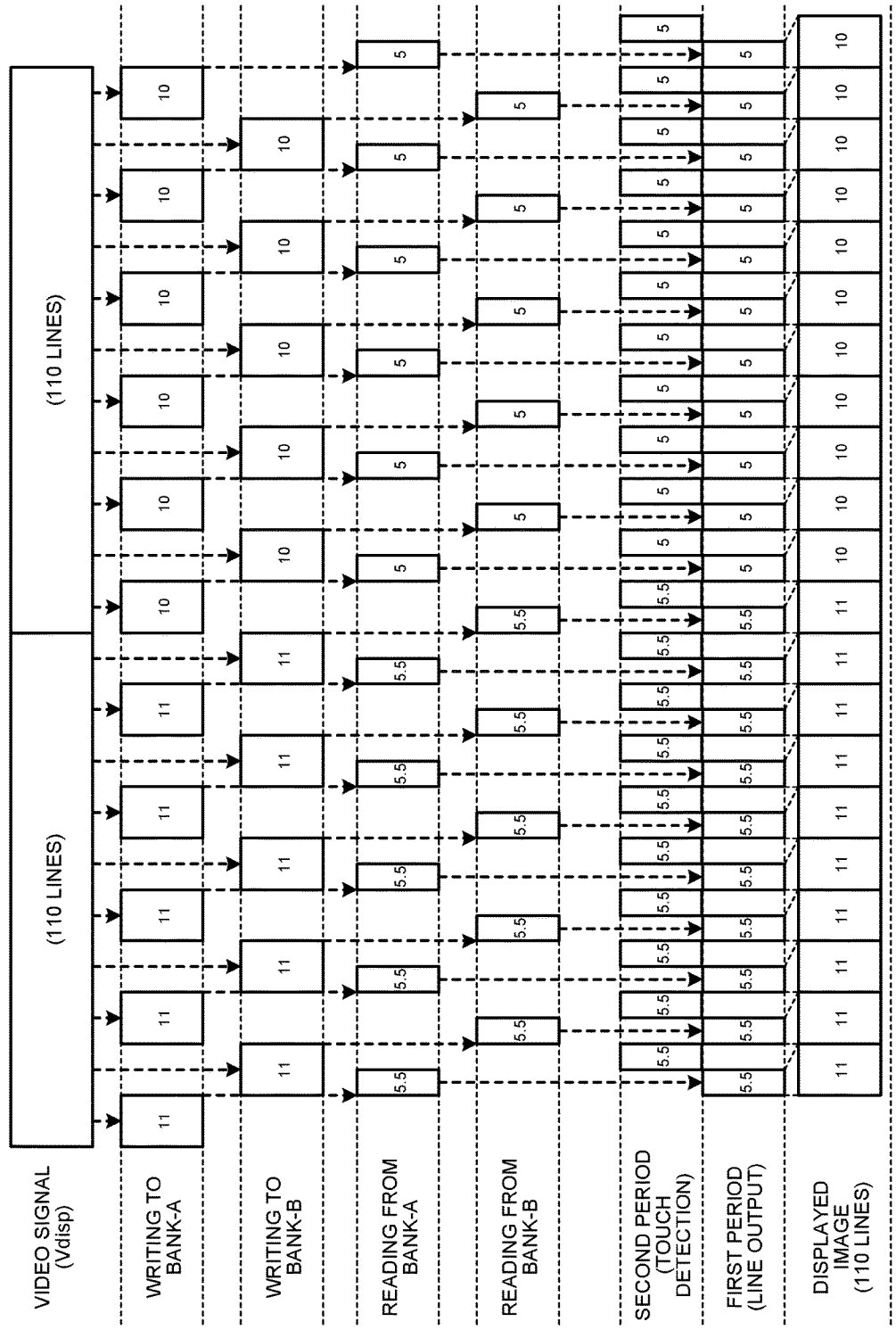
FIG. 21 is a timing chart of an example of a relation between the first period and the second period according to a first modification.

The following describes a first modification and a second modification of the embodiment according to the present invention with reference to FIGS. 21 and 22, respectively. In the description of the modifications, components similar to those of the embodiment are denoted by the same reference numerals, and explanation thereof will be omitted. The modifications are the same as the embodiment except that the lengths of the first period and the second period are different from those of the embodiment.

First Modification

FIG. 21 is a timing chart of an example of a relation between the first period and the second period according to the first modification. The operation control circuit 80 may set the length of each of the first period and the second period in a display period of an image of one frame to a fixed length and vary the length of the first period, the length of the second period, or both in display periods of images of two frames that are displayed consecutively. As illustrated in FIG. 21, for example, let us assume a case where the operation control circuit 80 performs displaying processing for two consecutive frames (a first frame and a second frame) and periodically performs displaying processing of the first period having a length of 11/2, i.e. 5.5, only in the display period of the first frame, thereby displaying an image of 110 lines corresponding to the first frame by 11 lines. In this case, in the display period of the second frame, the operation control circuit 80 periodically performs displaying processing of the first period (e.g., the first period having a length of 5 corresponding to 10 lines) different from that in the first frame, such that an image of 110 lines corresponding to the second frame is displayed. The respective first periods of the consecutive frames simply need to be different from each other, and the first period of the second frame may be shorter or longer than that of the first frame.

FIG. 21 only illustrates the display periods of images of two consecutive frames. The operation control circuit 80 also performs display processing for the third frame and the frames subsequent thereto in the same manner as the second frame. In other words, the operation control circuit 80 fixes the length of the first period only in a display period of an image of one frame and makes the length of the first period in each frame different from that of the previous frame thereof.

In the first modification, the second period for touch detection processing that is performed in the display periods of the images of respective frames is set to a period corresponding to the first period. In the case of the first period having a length of 5.5 for display processing of displaying an image of 110 lines by 11 lines, for example, the length of the second period is also set to 5.5 detection blocks. In the case of the first period having a length of 5 for display processing of displaying an image of 110 lines by 10 lines, the length of the second period is also set to 5 detection blocks.

According to the first modification, the first period and the second period are set to a fixed period in a display period of an image of one frame. This can simplify timing control for the display processing and the touch detection processing. Furthermore, the operation control circuit 80 of the first modification varies the first period in display periods of images of two frames that are displayed consecutively. The first modification thus can make the first period aperiodic in display periods of images of a plurality of frames that are displayed consecutively. Consequently, it is possible to reduce periodic generation of noise by simplified timing control.

Second Modification

FIG. 22 is a timing chart of an example of a relation between the first period and the second period according to the second modification. In the first modification, the lengths of the first period and the second period vary in display periods of images of two frames that are displayed consecutively. The operation control circuit 80 may set the lengths of the first period and the second period in a display period of an image of one frame to a fixed period and vary the length of the first period in display periods of images of two frames that are displayed consecutively. Specifically, as illustrated in FIG. 22, for example, the operation control circuit 80 may perform the same control as that of the first modification on the first period and set the second period to a fixed period (n) over display periods of a plurality of consecutive frames. Also in this case, the operation control circuit 80 of the second modification can make the first period aperiodic in display periods of images of a plurality of frames that are displayed consecutively. Thus it is possible to reduce periodic generation of noise by further simplified timing control.

The second period according to the second modification falls within an execution period of the shortest first period employed in display periods of images of a plurality of consecutive frames. In the example illustrated in FIG. 22, n≤5 is satisfied (n is the length of the second period) because the second period (n) falls within an execution period of the shorter first period (5) out of the first periods in the two frames illustrated in FIG. 22.

The operation control circuit 80 may vary the length of either one of the first period and the second period in a display period of an image of one frame and set the length of the other to a fixed value. The operation control circuit 80, for example, may set the lengths of the consecutive first periods to a, b, . . . (a and b are different values) in a display period of an image of one frame. With this setting, the operation control circuit 80 can make the first period aperiodic even if the length of the second period between the first periods is a fixed value. By contrast, the operation control circuit 80 may set the lengths of the consecutive second periods to c, d, . . . (c and d are different values) in a display period of an image of one frame. With this setting, the operation control circuit 80 can make the second period aperiodic even if the length of the first period is a fixed value.

While the operation control circuit 80 of the modifications above varies the length of the first period by changing the number of lines in one display processing, the operation control circuit 80 may vary the length of the first period by increasing or decreasing the drive speed of liquid crystals. Specifically, let us assume a case where a plurality of (M) processing blocks serving as units of processing in the display processing and the touch detection processing are determined in common between the display area Ad and the touch detection area. When a time to perform the display processing and the touch detection processing once on the processing blocks is one block time, one block time (Block) is represented by Expression (1). In Expression (1), FPS is a frame rate. Because the display processing and the touch detection processing are performed once in one block time (Block), one block time (Block) is represented by Expression (2) where LC is the first period, and TO is the second period. The first period (LC) is represented by Expression (3) using the number of lines (L) in one block and a drive time (t) of one line. By changing the drive time (t) of one line in consecutive frames, it is possible to vary the first period (LC). By varying the first period (LC), it is possible to vary the length of the second period (TO) derived from Expression (2), that is, a time obtained by subtracting the first period (LC) from one block time (Block).

$$\text{Block}=1/\text{FPS}/M \tag{1}$$

$$\text{Block}=LC+TO \tag{2}$$

$$LC=L\times t \tag{3}$$

When Y is the number indicating the ratio of the first period in one block time (Block), Y is represented by Expression (4). When a block frequency (BHz) is the number indicating how many processing blocks are subjected to the display processing per second, the block frequency (BHz) is represented by Expression (5). The ratio of the first period to one block time (Block) may differ between consecutive frames such that Y varies between the consecutive frames.

$$Y=LC/\text{Block} \tag{4}$$

$$\text{BHz}=\text{FPS}\times M\times Y \tag{5}$$

The memory 63 is not limited to a partial RAM and simply needs to be a storage device (memory) that can store therein data on an image to be output to the liquid-crystal display device 20 via the source driver 13. The relation between the time for writing data and the time for reading data of the memory 63 may be appropriately changed. The minimum unit of the first period may correspond to a period for reading data of one line or a period for reading data of three or more lines.

The present disclosure has been described with reference to the embodiment and the application example to an electronic apparatus. The present disclosure, however, is not limited to the embodiment and the like, and various changes can be made. The present invention naturally provides advantageous effects clearly defined by the description in the present specification or appropriately conceivable by those skilled in the art out of other advantageous effects provided by the aspects described in the present embodiment.

What is claimed is:

1. A display device comprising:
   a plurality of pixels;
   a plurality of scan lines each coupled to the plurality of pixels;
   a plurality of touch detection electrodes to supply a touch detection signal; and
   a controller configured to:
      control a plurality of frame operations including a first frame operation and a second frame operation next to the first frame operation, each of the first frame operation and the second frame operation including a plurality of display processes to supply a scan signal to the scan lines selectively and a plurality of touch detection processes to receive the touch detection signal from the touch detection electrodes selectively, and
      supply the scan signal to a same number of the scan lines in each of the first frame operation and the second frame operation, wherein the plurality of display processes in the first frame operation and the second frame operation include one or more first display processes and one or more second display processes, wherein the controller is configured to supply the scan signal to:
 a first number of the scan lines in each of the one or more first display processes, and
 a second number of the scan lines in each of the one or more second display processes, and
the first number is different from the second number.

2. The display device according to claim 1,
wherein the one or more first display process are the first display processes,
wherein the one or more second display process are the second display processes, and
wherein the controller is configured to:
 control the first display processes in the first frame operation,
 control the second display processes in the second frame operation,
 supply the scan signal to the first number of the scan lines in each of the first display processes, and
 supply the scan signal to the second number of the scan lines in each of the second display processes.

3. The display device according to claim 1, wherein the controller is configured to control the one or more first display processes and the one or more second display processes in the first frame operation.

4. The display device according to claim 1, further comprising:
 a memory that is configured to store data corresponding to one of the display processes,
 wherein the controller is configured to write the data to the memory in a writing period and read the data from the memory in a reading period that is shorter than the writing period.

5. The display device according to claim 1, further comprising:
 a power supply circuit that is configured to supply electric power to the controller and includes a charge pump provided with a ceramic capacitor.

6. The display device according to claim 4,
wherein the controller is configured to write first data to the memory in a first writing period and read the first data from the memory in a first reading period,
wherein the controller is configured to write second data to the memory in a second writing period and read the second data from the memory in a second reading period, and
wherein a ratio of the first writing period and the first reading period is equal to a ratio of the second writing period and the second reading period.

7. The display device according to claim 1, further comprising:
 a memory-A; and
 a memory-B,
 wherein the controller is configured to write first data corresponding to the first number of scan lines to the memory-A and then to write second data corresponding to the second number of scan lines to the memory-B, and
 wherein the controller is configured to control each of the touch detection processes in a first touch detection period that is after reading the first data from the memory-A and before writing the second data to the memory-B.

8. The display device according to claim 7,
wherein the controller is configured to write the second data to the memory-B and then to write third data corresponding to a third number of scan lines to the memory-A,
wherein the third number of scan lines is different from the first number of scan lines, the controller is configured to control the touch detection processes in a second touch detection period that is after reading the second data from the memory-B and before writing the third data to the memory-A, and
wherein the first touch detection period is different from the second touch detection period.

9. The display device according to claim 1, further comprising a plurality of first electrodes each arranged in respective pixels and at least one second electrode being opposed to the first electrodes,
wherein each of the touch detection electrodes is configured to supply the touch detection signal based on a capacitance generated with one of the first electrodes and the second electrode.

10. The display device according to claim 5,
wherein the controller is configured to write first data to the memory in a first writing period and read the first data from the memory in a first reading period,
wherein the controller is configured to write second data to the memory in a second writing period and read the second data from the memory in a second reading period, and
wherein a ratio of the first writing period and the first reading period is equal to a ratio of the second writing period and the second reading period.

11. The display device according to claim 5, further comprising:
 a memory-A; and
 a memory-B,
 wherein the controller is configured to write first data corresponding to the first number of scan lines to the memory-A and then to write second data corresponding to the second number of scan lines to the memory-B, and
 wherein the controller is configured to control each of the touch detection processes in a first touch detection period that is after reading the first data from the memory-A and before writing the second data to the memory-B.

12. The display device according to claim 11,
wherein the controller is configured to write the second data to the memory-B and then to write third data corresponding to a third number of scan lines to the memory-A,
wherein the third number of scan lines is different from the first number of scan lines, the controller is configured to control the touch detection processes in a second touch detection period that is after reading the second data from the memory-B and before writing the third data to the memory-A, and
wherein the first touch detection period is different from the second touch detection period.

13. The display device according to claim 5, further comprising a plurality of first electrodes each arranged in respective pixels and at least one second electrode being opposed to the first electrodes,
wherein each of the touch detection electrodes is configured to supply the touch detection signal based on a capacitance generated with one of the first electrodes and the second electrode.

14. An electronic apparatus comprising:
a display device including
- a plurality of pixels;
- a plurality of scan lines each coupled to the plurality of pixels;
- a plurality of touch detection electrodes to supply a touch detection signal; and
- a controller configured to
  - control a plurality of frame operations including a first frame operation and a second frame operation next to the first frame operation, each of the first frame operation and the second frame operation including a plurality of display processes to supply a scan signal to the scan lines selectively and a plurality of touch detection processes to receive the touch detection signal from the touch detection electrodes selectively, and
  - supply the scan signal to a same number of the scan lines in each of the first frame operation and the second frame operation,
- wherein the plurality of display processes in the first frame operation and the second frame operation include one or more first display processes and one or more second display processes, and
- wherein the controller is configured to supply the scan signal to:
  - a first number of the scan lines in each of the one or more first display processes, and
  - a second number of the scan lines in each of the one or more second display processes, and
  - the first number is different from the second number.

15. The electronic apparatus according to claim 14,
- wherein the one or more first display process are the first display processes,
- wherein the one or more second display process are the second display processes, and
- the controller is further configured to:
  - control the first display processes in the first frame operation,
  - control the second display processes in the second frame operation,
  - supply the scan signal to the first number of the scan lines in each of the first display processes, and
  - supply the scan signal to the second number of the scan lines in each of the second display processes.

16. The electronic apparatus according to claim 14, wherein the controller is configured to control the one or more first display processes and the one or more second display processes in the first frame operation.

17. The electronic apparatus according to claim 14, wherein
- the display device further comprises a memory that is configured to store data corresponding to one of the display processes, and
- the controller is configured to write the data to the memory in a writing period and read the data from the memory in a reading period that is shorter than the writing period.

18. The electronic apparatus according to claim 14, wherein the display device further comprises a power supply circuit that is configured to supply electric power to the controller and a charge pump provided with a ceramic capacitor.

* * * * *